US008377490B2

(12) United States Patent
Holmes et al.

(10) Patent No.: US 8,377,490 B2
(45) Date of Patent: *Feb. 19, 2013

(54) METHOD AND SYSTEM FOR MAKING SLICED CHEESE

(75) Inventors: Terry L. Holmes, Monona, WI (US); Orestes Rivero, Skokie, IL (US)

(73) Assignee: Kraft Foods Global Brands LLC, Northfield, IL (US)

(*) Notice: Subject to any disclaimer, the term of this patent is extended or adjusted under 35 U.S.C. 154(b) by 105 days.

This patent is subject to a terminal disclaimer.

(21) Appl. No.: 11/533,235

(22) Filed: Sep. 19, 2006

(65) Prior Publication Data

US 2007/0178212 A1 Aug. 2, 2007

Related U.S. Application Data

(63) Continuation-in-part of application No. 11/229,662, filed on Sep. 20, 2005.

(51) Int. Cl.
*A23P 1/12* (2006.01)

(52) U.S. Cl. .................... 426/516; 426/518

(58) Field of Classification Search .............. 426/582, 426/517, 516, 518; 425/382.4
See application file for complete search history.

(56) References Cited

U.S. PATENT DOCUMENTS

| 2,351,493 A | * | 6/1944 | Curry ............................ 425/188 |
| 2,670,296 A | | 2/1954 | Tansley |
| 2,712,693 A | | 7/1955 | Comparette |
| 2,794,746 A | | 6/1957 | Schwartz |
| 2,991,503 A | | 7/1961 | Rietz |
| 3,090,075 A | | 5/1963 | Provenzana et al. |
| 3,238,046 A | | 3/1966 | Komarik |
| 3,506,046 A | | 4/1970 | Webb |
| 3,562,910 A | * | 2/1971 | Runge et al. ................ 426/466 |
| 3,605,647 A | * | 9/1971 | Beck et al. .................... 425/168 |
| 3,722,034 A | | 3/1973 | Baccetti |
| 3,727,308 A | | 4/1973 | Ross |
| 3,771,937 A | | 11/1973 | Harmon et al. |
| 3,776,073 A | * | 12/1973 | Runge ............................ 83/47 |
| 3,829,594 A | | 8/1974 | Schweizer, Jr. |
| 3,831,866 A | | 8/1974 | Phillips |
| 3,891,783 A | | 6/1975 | Robertson et al. |
| 3,961,077 A | | 6/1976 | Kielsmeier |
| 4,051,757 A | | 10/1977 | Reifenhauser et al. |
| 4,062,260 A | | 12/1977 | Steinhogl |
| 4,078,874 A | | 3/1978 | Lenhardt, Sr. |
| 4,118,164 A | | 10/1978 | Wenger et al. |
| 4,145,453 A | | 3/1979 | Lenhardt, Sr. |
| 4,185,126 A | | 1/1980 | Spors |
| 4,190,410 A | | 2/1980 | Rhodes |
| 4,205,415 A | | 6/1980 | Orchard |
| 4,260,640 A | | 4/1981 | Hartmann et al. |
| 4,280,385 A | | 7/1981 | Kienzl |
| 4,290,989 A | | 9/1981 | Topor et al. |
| 4,321,026 A | | 3/1982 | Lambertus |
| 4,339,468 A | | 7/1982 | Kielsmeier |
| 4,342,242 A | | 8/1982 | Schaum |
| 4,382,969 A | * | 5/1983 | Sadler ............................ 426/272 |
| 4,422,372 A | | 12/1983 | Hoezee |
| 4,442,131 A | | 4/1984 | Nagy et al. |
| 4,503,995 A | | 3/1985 | Anderson |
| 4,530,132 A | | 7/1985 | Wagner |
| 4,580,490 A | | 4/1986 | Jorgensen |
| 4,620,838 A | | 11/1986 | Miller et al. |
| 4,669,254 A | | 6/1987 | Muzzarelli |
| 4,689,236 A | | 8/1987 | Pinto |
| 4,697,505 A | | 10/1987 | Brewer et al. |
| 4,731,006 A | | 3/1988 | Freda et al. |
| 4,738,863 A | | 4/1988 | Lindgren, Sr. et al. |
| 4,759,704 A | | 7/1988 | Kraus |
| 4,776,266 A | | 10/1988 | Bradshaw, Jr. |
| 4,788,750 A | | 12/1988 | Bachtold |
| 4,800,094 A | | 1/1989 | Freda et al. |
| 4,820,470 A | | 4/1989 | Ferrero |
| 4,850,837 A | | 7/1989 | Lindgren, Sr. et al. |
| 4,868,002 A | | 9/1989 | Scaglione et al. |
| 4,871,566 A | | 10/1989 | Farnum et al. |
| 4,883,417 A | | 11/1989 | Morikawa et al. |
| 4,902,523 A | | 2/1990 | Fritchen et al. |

(Continued)

FOREIGN PATENT DOCUMENTS

EP 0580757 7/1997
EP 1099381 A2 5/2001

(Continued)

OTHER PUBLICATIONS

20010001671, May 24, 2001, Withdrawn. Schnell, Karl, KS Vacuum Filler P 9 SE Typ/Type 595, P 10 SE Typ/Type 596, Brochure, Germany, May 2004.
Amendment filed Dec. 1, 2011, U.S. Appl. No. 11/229,662, titled Method and System for Making Shredded Cheese, inventors: Orestes Rivero et al., 18 pages.
Declaration of Vijay Arora under 37 C.F.R. 1.132, filed Dec. 1, 2011, U.S. Appl. No. 11/229,662, titled Method and System for Making Shredded Cheese, inventors: Orestes Rivero et al., 13 pages.
United States Department of Agriculture, USDA Specifications for Mozzarella Cheeses, Jan. 7, 1980, 7 pages.
United States Patent and Trademark Office, Non-Final Office Action mailed Dec. 2, 2008, U.S. Appl. No. 11/229,662, titled Method and System for Making Shredded Cheese, inventors: Orestes Rivero et al., 25 pages.
Amendment filed Jun. 2, 2009, U.S. Appl. No. 11/229,662, titled Method and System for Making Shredded Cheese, inventors: Orestes Rivero et al., 13 pages.
United States Patent and Trademark Office, Final Office Action mailed Sep. 14, 2009, U.S. Appl. No. 11/229,662, titled Method and System for Making Shredded Cheese, inventors: Orestes Rivero et al., 25 pages.
Amendment filed Dec. 14, 2009, U.S. Appl. No. 11/229,662, titled Method and System for Making Shredded Cheese, inventors: Orestes Rivero et al., 10 pages.

(Continued)

*Primary Examiner* — D. Lawrence Tarazano
*Assistant Examiner* — Jenna A Watts
(74) *Attorney, Agent, or Firm* — Fitch, Even, Tabin & Flannery, LLP

(57) ABSTRACT

A method and system are provided for forming sliced cheese directly from a quantity of cheese, without the need to thermally process the cheese. In general, cheese slices are formed from a quantity of cheese in which at least one discrete cheese piece is introduced into an elongated chamber having a longitudinal interior surface and housing a conveyor. Resulting cheese mass is transported forwardly and longitudinally of the chamber via the conveyor to a discharge outlet of the chamber and into a funnel. The cheese mass is extruded at a temperature of less than about 50° F. as a plurality of cheese extrudate sheets through a plurality of elongated orifices of a die plate which receive cheese mass exiting from the outlet of the funnel. The cheese extrudate sheets are cut along their lengths to provide discrete cheese slices.

16 Claims, 13 Drawing Sheets

U.S. PATENT DOCUMENTS

| | | | |
|---|---|---|---|
| 4,942,052 | A | 7/1990 | Posdal |
| 4,959,240 | A | 9/1990 | Aulik et al. |
| 4,995,803 | A | 2/1991 | Champalaune et al. |
| 5,061,507 | A | 10/1991 | Aulik et al. |
| 5,198,237 | A | 3/1993 | Colosimo et al. |
| 5,350,290 | A | 9/1994 | Honings |
| 5,356,652 | A | 10/1994 | Campbell |
| 5,480,666 | A | 1/1996 | Lindgren |
| 5,505,608 | A | 4/1996 | Tomatis |
| 5,520,934 | A | 5/1996 | Meilleur |
| 5,573,805 | A | 11/1996 | Fager et al. |
| 5,591,472 | A * | 1/1997 | Cummins ............... 426/503 |
| 5,601,855 | A | 2/1997 | Fager et al. |
| 5,643,618 | A * | 7/1997 | Huberg et al. ............ 425/382.4 |
| 5,673,612 | A | 10/1997 | Svendsen |
| 5,688,534 | A | 11/1997 | Watanabe et al. |
| 5,711,976 | A | 1/1998 | Abler |
| 5,770,241 | A | 6/1998 | Tuzzio et al. |
| 5,792,497 | A | 8/1998 | Abler et al. |
| 5,792,500 | A | 8/1998 | Housset et al. |
| 5,820,911 | A | 10/1998 | Morse et al. |
| 5,855,937 | A | 1/1999 | Okamoto et al. |
| 5,881,639 | A | 3/1999 | Nesheim et al. |
| 5,919,509 | A * | 7/1999 | Cremers et al. ............ 426/516 |
| 5,983,769 | A | 11/1999 | Schneider |
| 6,079,323 | A | 6/2000 | Dzenis |
| 6,296,468 | B1 | 10/2001 | Deutsch et al. |
| 6,331,104 | B1 | 12/2001 | Kobussen et al. |
| 6,403,138 | B1 * | 6/2002 | Arora ............... 426/516 |
| 6,415,711 | B1 | 7/2002 | Penta |
| 6,440,481 | B1 | 8/2002 | Gascoigne et al. |
| 6,443,055 | B1 | 9/2002 | Hashimoto et al. |
| 6,468,579 | B1 | 10/2002 | Roussel et al. |
| 6,475,538 | B2 | 11/2002 | Thakar et al. |
| 6,479,087 | B1 | 11/2002 | Cole et al. |
| 6,531,077 | B1 | 3/2003 | Flarup-Knudsen |
| 6,561,235 | B2 | 5/2003 | Finkowski et al. |
| 6,575,725 | B1 | 6/2003 | Keel |
| 6,632,466 | B2 | 10/2003 | Roussel et al. |
| 6,640,848 | B1 | 11/2003 | McIsaac et al. |
| 6,652,899 | B1 | 11/2003 | Keel |
| 6,773,739 | B2 | 8/2004 | Hauck et al. |
| 6,942,888 | B2 | 9/2005 | Mueller |
| 6,964,562 | B2 | 11/2005 | Hunter |
| 7,648,352 | B2 | 1/2010 | Morales-Alvarez et al. |
| 7,758,905 | B2 | 7/2010 | Holmes |
| 2001/0019732 | A1 | 9/2001 | Roussel et al. |
| 2001/0043962 | A1 | 11/2001 | MacFarland |
| 2002/0037337 | A1 | 3/2002 | Oki et al. |
| 2003/0008056 | A1 * | 1/2003 | Henry et al. ............ 426/582 |
| 2003/0228387 | A1 | 12/2003 | Hunter |
| 2004/0025651 | A1 * | 2/2004 | Bachman et al. ............ 83/13 |
| 2004/0144262 | A1 | 7/2004 | Mueller |
| 2004/0194642 | A1 | 10/2004 | Owens |
| 2004/0265456 | A1 | 12/2004 | Halverson et al. |
| 2005/0123663 | A1 * | 6/2005 | White et al. ............ 426/518 |
| 2006/0165860 | A1 | 7/2006 | Lowry et al. |
| 2007/0065550 | A1 * | 3/2007 | Rivero et al. ............ 426/515 |
| 2011/0014311 | A1 | 1/2011 | Holmes et al. |

FOREIGN PATENT DOCUMENTS

| | | |
|---|---|---|
| EP | 0727138 | 7/2001 |
| JP | 56058448 A2 | 5/1981 |
| JP | 59006931 | 1/1984 |
| JP | 2124060 | 5/1990 |
| JP | 03-195477 | 8/1991 |
| JP | 04-179442 | 6/1992 |
| JP | 5236875 | 9/1993 |
| JP | 8140572 | 6/1996 |
| WO | 92/18019 | 10/1992 |
| WO | 95/21532 | 8/1995 |
| WO | 9528090 A1 | 10/1995 |
| WO | 9603860 | 2/1996 |
| WO | 97/47206 | 12/1997 |
| WO | 2005039324 A2 | 5/2005 |

OTHER PUBLICATIONS

United States Patent and Trademark Office, Non-Final Office Action mailed Mar. 25, 2010, U.S. Appl. No. 11/229,662, titled Method and System for Making Shredded Cheese, inventors: Orestes Rivero et al., 26 pages.

Amendment filed Aug. 25, 2010, U.S. Appl. No. 11/229,662, titled Method and System for Making Shredded Cheese, inventors: Orestes Rivero et al., 9 pages.

United States Patent and Trademark Office, Final Office Action mailed Oct. 12, 2010, U.S. Appl. No. 11/229,662, titled Method and System for Making Shredded Cheese, inventors: Orestes Rivero et al., 22 pages.

Amendment filed Apr. 12, 2011, U.S. Appl. No. 11/229,662, titled Method and System for Making Shredded Cheese, inventors: Orestes Rivero et al., 15 pages.

Declaration of Vijay Arora under 37 C.F.R. 1.132, filed Apr. 12, 2011, U.S. Appl. No. 11/229,662, titled Method and System for Making Shredded Cheese, inventors: Orestes Rivero et al., 10 pages.

United States Patent and Trademark Office, Non-Final Office Action mailed Jun. 1, 2011, U.S. Appl. No. 11/229,662, titled Method and System for Making Shredded Cheese, inventors: Orestes Rivero et al., 26 pages.

Karl Schnell GmbH & Co. KG, KS Vacuum Filler Brochure, KS Pump System, Winterbach, Germany, © Mar. 2004, 4 pages.

Marlen Research Corporation, Opti-Series Brochure, Overland Park, Kansas, 6 pages (no date).

Karl Schnell, P9 P10 SE webpage, http://www.karlschnell.de/02_fuelltechnik/02_p9-p10.html, accessed May 23, 2006, 2 pages.

Karl Schnell, Vacuum fillers, type P9 SE and P10 SE webpage, http://www.karlschnell.com/filler.html, accessed May 1, 2006, 1 page.

Paragon Processing Solutions Ltd., webpage, http://www.paragonpsl.com/products.php?manufacturerID=Meta, accessed May 1, 2006, 1 page.

Marlen Research Corporation, Extruders Model 750 website, http://www.marlen.com/extrude.htm, accessed May 1, 2006, 1 page.

United States Patent and Trademark Office, Non-Final Office Action mailed Mar. 2, 2009, U.S. Appl. No. 11/618,467, titled Method and System for Making Extruded portions of Cheese, inventor: Terry Holmes, 15 pages.

Amendment filed Jun. 2, 2009, U.S. Appl. No. 11/618,467, titled Method and System for Making Extruded Portions of Cheese, inventor: Terry Holmes, 12 pages.

United States Patent and Trademark Office, Non-Final Office Action mailed Aug. 28, 2009, U.S. Appl. No. 11/618,467, titled Method and System for Making Extruded portions of Cheese, inventor: Terry Holmes, 18 pages.

Amendment filed Nov. 30, 2009, U.S. Appl. No. 11/618,467, titled Method and System for Making Extruded Portions of Cheese, inventor: Terry Holmes, 9 pages.

United States Patent and Trademark Office, Notice of Allowance mailed Mar. 9, 2010, U.S. Appl. No. 11/618,467, titled Method and System for Making Extruded Portions of Cheese, inventor: Terry Holmes, 6 pages.

* cited by examiner

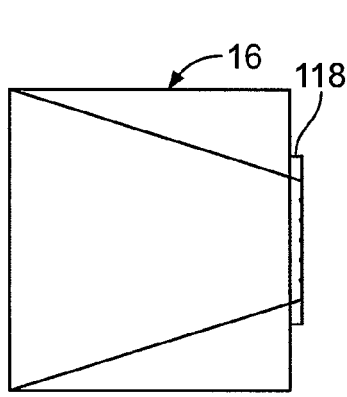
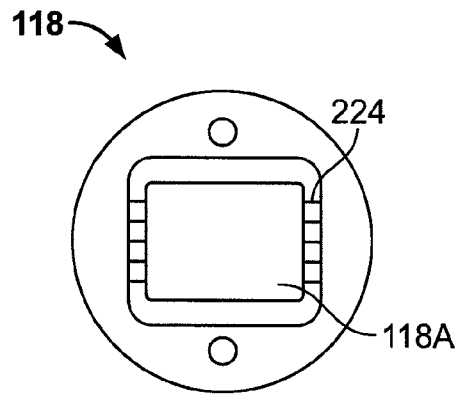
FIG. 15A  FIG. 15B
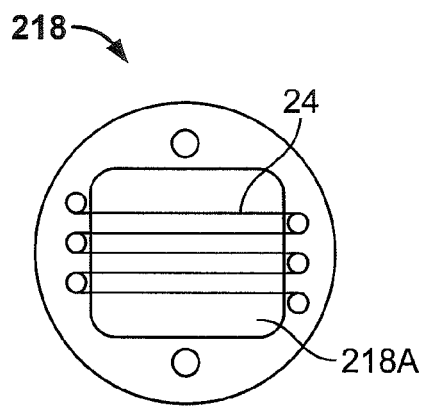
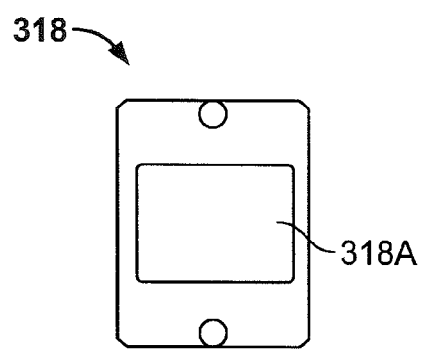
FIG. 15C  FIG. 15D

METHOD AND SYSTEM FOR MAKING SLICED CHEESE

RELATED APPLICATIONS

This is a continuation-in-part of U.S. patent application Ser. No. 11/229,662, filed on Sep. 20, 2005, entitled "Method and System for Making Shredded Cheese," which is hereby incorporated by reference in its entirety.

FIELD OF THE INVENTION

The present invention relates generally to a method and system for making shredded or sliced cheese.

BACKGROUND OF THE INVENTION

Shredded cheese, or cheese in the form of elongated shreds or other shapes, is commonly used as a food topping, such as a pizza topping, etc. Sliced cheese is commonly used in making sandwiches or for use as a snack, such as in a Lunchables® package. Automated conversion of bulk pieces of cheese, such as blocks or loaves, into shreds or slices as part of a continuous operation is technologically challenging. Commercially-available equipment for automated shredding or slicing of cheese in high volumes is scarce.

Cheeses, such as mozzarella, that may be relatively elastic in loaf or brick form at ambient conditions can be particularly difficult to form directly into shreds of substantially uniform dimensions. Milling has been used as one way to convert mozzarella loaf into shreds. However, the elasticity of the mozzarella cheese can make milling type shredding difficult to practice. Depending on the process set-up, mozzarella cheese loaves and bricks may be stored under refrigerated conditions until subjected to subsequent shredding operations. The chilled cheese tends to toughen, making it even more difficult to shred into shred-like pieces or strands of substantially uniform size. Mozzarella cheese loaf has been heated to a molten condition in an extruder, and then discharged under compressive force through circular die holes of a die plate to form cheese strings, which are cooled in a brine solution. The cheese extrudates are cooled immediately upon extrusion before they deform, stick together, and/or otherwise lose the discrete elongated shape imparted by the extruder die. The conversion of the cheese to molten form and post-extrusion brine treatment increase process complexity and cost.

There also is a demand for low fat mozzarella cheeses in particular, which tend to have higher moisture content than the full fat counterpart products. At higher moisture content, some cheeses, such as mozzarella cheese, tend to become softer, making it even more difficult to shred the cheese using conventional shredding techniques.

In addition, some cheeses may be sliced instead of shredded. The cheese slices can be produced in bulk ribbon pieces which are then cut into slices by using wires to cut the ribbon into sheets and subsequently into slices. The cheese slices cut in this manner tends to stick together and the slices may be required to be separated from other slice stacks by hand.

There is a need for arrangements for forming cheese loaf, blocks or pieces directly into stable elongated shreds or slices, and particularly chilled high moisture content cheese loaf, in an automated, non-manual manner without the need to heat process the cheese. As will become apparent from the descriptions that follow, the invention addresses these needs as well as providing other advantages and benefits.

SUMMARY OF THE INVENTION

The invention provides a method and system for forming shredded cheese directly from a quantity of cheese in an automated manner without the need to thermally process the cheese. In general, cheese shreds are formed from a quantity of cheese in which at least one discrete cheese piece is introduced into an elongated chamber which houses a conveyor operable to form homogenous cheese mass from the at least one cheese piece. Resulting cheese mass is transported forwardly and longitudinally of the chamber via the conveyor to a discharge outlet of the chamber. The cheese mass is pumped to a die plate under positive pressure. The cheese mass is extruded as continuous cheese extrudate strands at a temperature of less than about 50° F. through a plurality of elongated orifices of the die plate which receives the cheese mass after discharge from the chamber. The cheese extrudate strands are cut intermittently along their lengths to form discrete cheese shreds.

The cheese shred products obtained by the method and system of the present invention have cross-sectional shapes substantially corresponding to the shapes of the orifices in the die plate. Processing the cheese mass at temperatures less than about 50° F. improves the microbiological stability of the product. It also reduces and avoids heat distortions from occurring in the shred product shape. It additionally eliminates the need for rapid quenching of hot cheese extrudates. This inventive method and system avoids the need for process control over complex systems incorporating heating jackets or internal heating systems in the extruder, piping, pumps, dies, etc. This reduces process complexity, requirements and costs. The cheese shreds may be deposited directly on food products or in food packaging tray cells as part of a food product manufacturing line. For instance, this automated method and system eliminates the need to use intensive manual labor to place cheese shreds as toppings upon pizza products or in food packaging tray cells, or difficult to control conventional shred sprinkling systems like vibratory belts. Alternatively, they may be collected for packaging as a shredded cheese product per se.

In one particular embodiment, the cheese shreds may be deposited directly onto an intermediate food product, such as a dough-containing products like pizza, facilitating food production such as by minimizing processing losses and weight variability. The types of cheese which may be processed according to embodiments of this invention include natural cheeses, process cheeses, and cheese analogs or substitutes, or mixtures thereof. In one embodiment, the cheese is mozzarella or other pasta filata cheese, or other varieties of cheese, such as Emmental (Swiss), Cheddar, Gouda, Edam, etc. In one particular embodiment, cheese shreds are produced from refrigerated, high-moisture content cheese with the method and system of embodiments herein. In a more particular embodiment, the cheese being processed is high moisture-content pasta filata cheese, such as mozzarella loaves, bricks, etc., having at least about 52% moisture-content. The methods in accordance with embodiments of this invention make it feasible to extrude high-moisture content cheese at temperatures less than about 50° F. in strand-form.

In one embodiment, the high-moisture cheese may comprise refrigerated mozzarella cheese having a moisture content of at least about 52%, which is processed under unheated conditions in the inventive shredding system. In a particular embodiment, the cheese pieces are introduced into, processed within the extruder, and extruded in strand-form at the die plate, at a temperature less than about 45° F., more particularly, less than about 40° F. In one aspect, refrigerated cheese is fed into the extruder chamber, and the cheese mass formed therefrom in the extruder is conveyed to the die plate, while being maintained under refrigerated temperature conditions. In one aspect, the temperature of the cheese when extruded at the die plate is about 32° F. to about 45° F., particularly about 35° F. to about 45° F. In this manner, it is possible to directly convert refrigerated or otherwise chilled cheese pieces into shreds of approximately uniform dimensions without the need to heat the cheese to flowable or molten state to assist extrusion, which avoids the need to provide post-extrusion quench procedures to stabilize and avoid shape distortion from occurring in otherwise hot extruded shapes.

In another particular embodiment, a pump is used to force cheese through a single or multiple large diameter showerhead type dies with elongated orifices resembling the desired cross-sectional shape of a cheese shred. This pump includes a screw-type vacuum filler which receives the cheese in blocks of equal or different sizes and compresses the cheese into an airless homogenous flow without damaging the physical or flavor characteristics of the cheese. The cheese mass is extruded at a temperature of less than about 50° F. through the elongated die orifices after it exits the discharge outlet of the chamber, providing cheese extrudate strands. In one embodiment, a reciprocating multiwire cutter that translates rotationally relative to the die plate is used to cut the extrudate strands into shreds of desired length.

In a more particular embodiment, the die plate used in methods in accordance with embodiments herein includes a plurality of passageways extending from the above-indicated plurality of elongated orifices at a discharge side of the die plate to an inlet side thereof for receiving cheese mass discharged from the discharge outlet of the chamber. For purposes herein, "elongated" orifice shapes have a major diameter dimension which is at least 25%, preferably at least about 50%, larger in dimension than a minor diameter dimension oriented approximately 90 degrees thereto. In one embodiment, the passageways have substantially uniform cross-sectional shape corresponding with the elongated shape of the orifices. The orifices are non-circular and particularly are generally oval shaped or almond shaped. In one embodiment, the orifices have a major diameter/minor diameter ratio of about 2.25:1 to about 1.75:1. The orifices have a major dimension of about 6 mm to about 6.5 mm, and a minor dimension of about 3 mm to about 3.25 mm. In one embodiment, the die plate may have a thickness, which corresponds with the length of the passageways therein, of approximately 6 mm to approximately 13 mm. Alternatively, the elongated orifices may be slots that are generally rectangular in shape and are located between cutting elements in order to produce slices.

In another particular embodiment, the cheese mass formed in the extruder is divided into multiple output streams with a water wheel, which feeds the output streams under pressure to respective die plates, which are operable for extruding continuous cheese extrudates through elongated orifices, which are cut into discrete shreds, at a plurality of food production lanes. The shreds may be deposited directly on a food product as a topping or in a food tray cell in each lane.

BRIEF DESCRIPTION OF THE DRAWINGS

FIG. 15A is an exploded, side cross-sectional view of an alternative die plate/funnel assembly, including a die plate, a harp plate with wires, and a wiper plate.

FIG. 15B is a front plan view of the alternative die plate of FIG. 15A.

FIG. 15C is a front plan view of the harp plate of FIG. 15A.

FIG. 15D is a front plan view of the wiper plate of FIG. 15A.

The figures are not necessarily drawn to scale. Similarly numbered elements in different figures represent like features unless indicated otherwise.

DETAILED DESCRIPTION OF THE PREFERRED EMBODIMENTS

The present invention relates to a method and a system for producing cheese shreds or slices from cheese extrudates. More specifically, this invention relates to extruding high moisture content mozzarella cheese at a temperature less than about 50° F. through a unique die comprising a die plate containing a plurality of orifices having elongated shapes, such as almond or oval shapes, etc., and the resulting cheese extrudate strands are intermittently cut along their lengths to provide individual cheese shreds. This invention also relates to extruding a processed or natural cheese at a temperature less than about 50° F. through a unique die comprising a die plate containing a plurality of orifices having elongated shapes, such as slots, and the resulting cheese extrudate sheets are intermittently cut along their lengths to provide discrete cheese slices.

Figure 1:
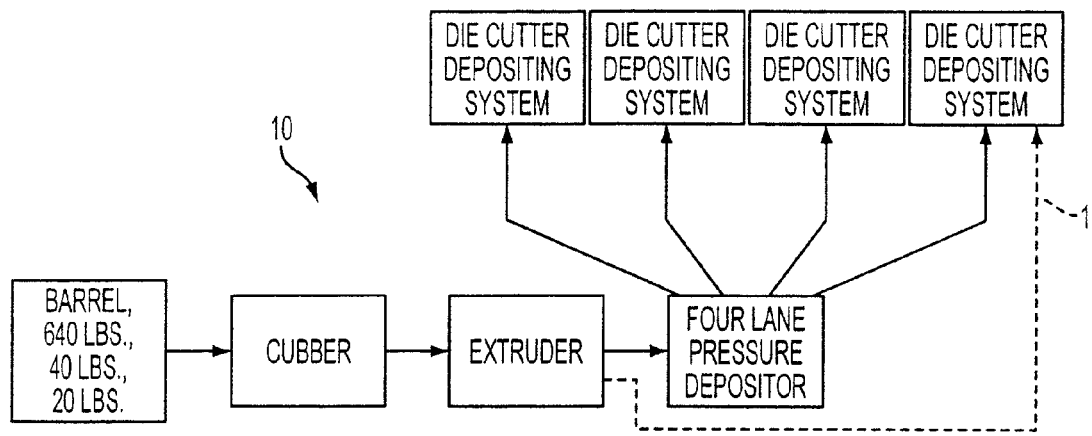
FIG. 1 is a flow chart of a method for converting cheese pieces into cheese shreds according to an embodiment of the present invention.

FIG. 1 is a flow chart of a method 10 for converting cheese pieces into cheese shreds according to an embodiment of the present invention. In this illustration, a large cheese barrel or block is subdivided into smaller blocks and then cubes, which are fed into an extruder operable to work the cheese pieces into a homogenous mass in ambient or chilled (unheated) conditions and the convey the cheese mass to a multi-lane pressure depositor operable to split the primary cheese mass stream into substreams of given proportion which are fed to a respective die and cutter set-up operable to form cheese shred at a product temperature below about 50° F.

Figure 2:
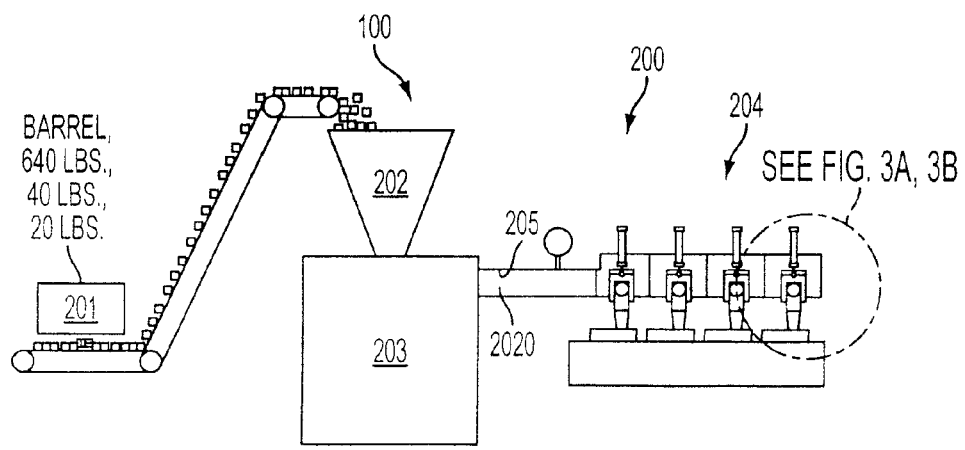
FIG. 2 is an elevational side elevation view of portion of a cheese shredding system including a vacuum-assisted loading extruder in accordance with an embodiment of the invention.
Figure 3A:
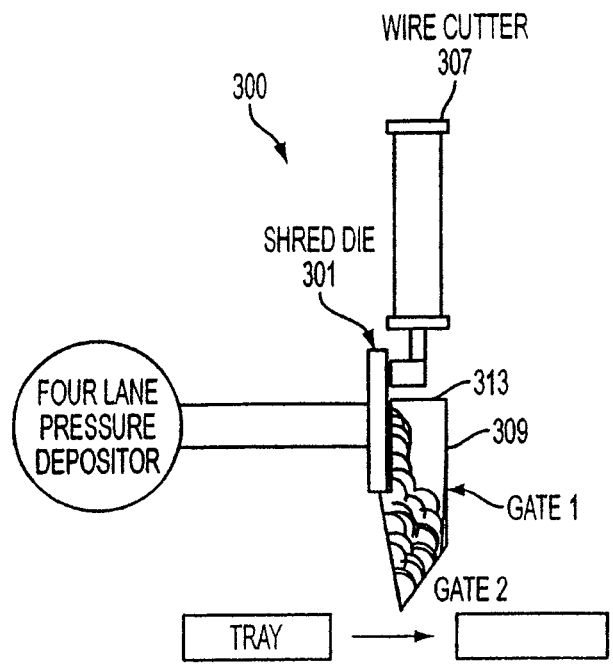
FIG. 3 is an elevational side elevational view of a shred depositing portion of the cheese shredding system of FIG. 2.
Figure 3B:
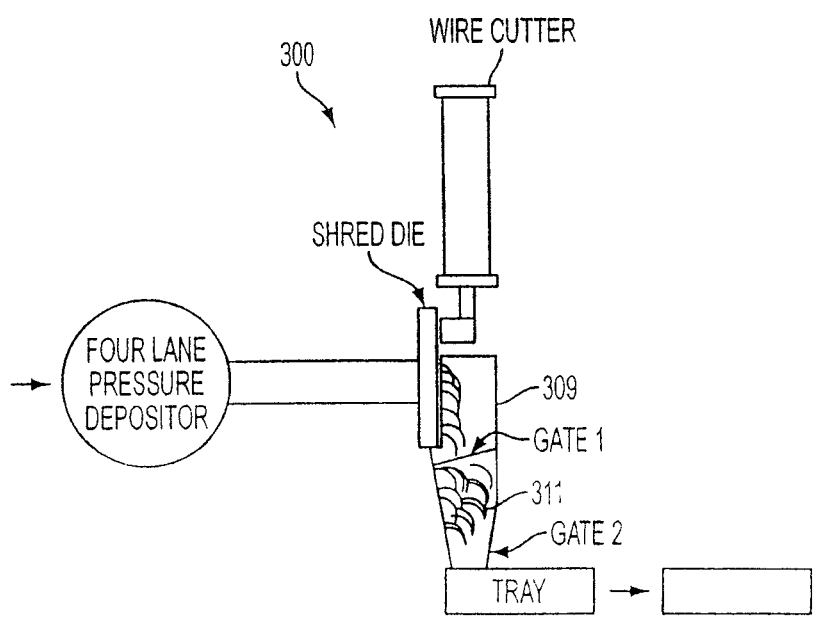

Referring to FIG. 2, a system 100 is shown for forming cheese shreds, which includes a cheese mass forming and pumping assembly 200, and a die plate assembly 300 (illustrated in more detail in FIG. 3). The conversion of the cheese pieces to shreds begins in system 200. In this non-limiting example, a large barrel or block of cheese (e.g. about 640 lb.) is initially cut into about 20-40 lb. blocks, which in turn are converted into cubes (or alternatively, loaves, bricks, etc, shreds, etc.) at cubber 201. The cubes are introduced into a hopper 202 of a screw extruder 203 equipped with a vacuum pump (not shown). The screw extruder works the cheese into cheese mass under ambient or chilled (unheated) conditions of less than about 50° F., and the resulting homogenous cheese mass is discharged from the extruder and conveyed under pressure to a water wheel 204, which subdivides the cheese mass flow into cheese mass substreams. These cheese mass substreams are pumped to respective die assemblies 300 for discharge as extrudate strands, which are intermittently cut to form discrete length shreds.

The cheese pieces used as feed material to system 100 may be natural cheese (e.g., mozzarella, sharp cheddar, medium cheddar, mild cheddar, Swiss, etc.), process cheese (e.g., American cheese), soy cheese, imitation cheese, or combinations thereof. In one embodiment, the cheese pieces are natural cheese. In one embodiment, the cheese pieces are mozzarella cheese, particularly high moisture content mozzarella cheese. In a particular embodiment, the mozzarella cheese feed and shredded product obtained therefrom with the inventive system have a fat content (on dry basis) of less than about 30 percent, moisture of about 52 to about 60 percent, salt of about 1.6 to about 1.8 percent, and a pH of about 5.1 to about 5.3. The loose cheese pieces may be used in any geometric shape as long as the largest dimension of the shape is compatible with the feeding capacities of the hopper and the extruder. For example, in one embodiment, natural cheddar cheese may be precut from a large block or other source into cubes or other smaller regular shapes weighing about 4.5 kg (10 pounds) or less. For example, cubes having a size of about 5.1 cm to about 10.2 cm (about 2 to about 4 inches) may be used for introduction into an extruder system fed by a frustoconical shaped hopper having about a 10.2 cm (4 inch) diameter bottom opening (e.g., circular, square, etc.) and an intermeshing twin screw feed comprised of a pair of about 3.8 cm to about 5.1 cm (about 1.5 to about 2 inch) diameter intermeshed screws. Other cheese piece shapes also may be used alone or in combination with other geometries, such as cylinders, bars, shreds, slices (e.g., rectangular) and so forth.

The loose pieces of natural cheese or other dairy products are fed into extruder hopper by any suitable means. The loose cheese pieces can be mechanically or manually fed into the hopper at a controlled rate. For instance, a conveyor may be used to transfer the loose pieces to the hopper from an intake bin (not shown). After entering the hopper, the cheese pieces descend into an extruder unit including a low-shear screw feed. The low-shear screw feed particularly comprises an intermeshing twin screw feed operable at low speeds and fitted with minimal clearance relative to the inner surface of a generally cylindrical extruder chamber (barrel) that houses the twin screw mechanism. The screws either rotate in the same direction (concurrent) or in opposite direction (countercurrent) to each other. After entering the low-shear screw feed, the cheese pieces are mixed and folded together. The extruder is equipped with a vacuum pump which evacuates air from space within the extruder barrel where the screw feed is housed and the cheese mass therein. In one particular embodiment, the vacuum pump is combined with a screw extruder as an integral unit. Commercially available vacuum pumps include, for example, VEMAG robot model HP-15C, manufactured by Robert Reiser & Co., which are packaged as integrated units with a twin screw feed assembly for meat stuffing operations.

Another example of a suitable pump is the KS Vacuum Filler, Type P9 SE, manufactured by Karl Schnell GmbH & Co. KG, which is a gear-type vacuum pump and is presently preferred for use in producing cheese slices. The Schnell gear pump uses a separate infeed auger drive which helps force the cheese into the pump gears, thus pushing the cheese through the pump. The Schnell gear pump can reduce the amount of shear upon the cheese as compared to the VEMAG. The Schnell gear pumps are capable of a continuous feed, as opposed to the use of piston pumps which may also provide low shear, but are non-continuous. Also, the Schnell P9 SE pump has very low visual fat disruption, due to its low shear effect.

As the twin screw feed is working and conveying cheese mass forward towards the discharge outlet it keeps the product from being sucked into the vacuum pump area. The vacuum-assisted loading of the extruder de-aerates the cheese pieces introduced into the screw feed and the resulting mass, such that a substantially continuous homogeneous mass can be formed which is substantially free of air pockets. Air pockets in the cheese mass are undesirable as they did to burst upon exiting the extruder after being under compression within the die, forming noticeable structural defects in the extrudate. The removal of entrained air from the cheese mass also helps provide a hard, dense extrudate. The vacuum formed in the interior space of the screw housing by vacuum pump also helps draw cheese pieces from the hopper into the screw feed.

The cheese mass is conveyed as a viscous, substantially continuous, uninterrupted homogeneous mass by the twin screw feed out a discharge outlet 2020 of the extruder into piping 205 through which the cheese mass flows to water wheel 204 and before further processing including shred production. During passage of the extrudable cheese mixture through the extruder barrel, the twin screw conveyor feed mechanism acts on the cheese mass to convey it towards the discharge outlet in the form of two adjoining ropes of cheese material, which are compacted into a single continuous mass in piping 205 after discharge from outlet 2020. The pitch of the intermeshing flighting is relatively close but without causing contact between the two intermeshed screws. Also, clearance between the outermost peripheries and of the screws and the inside surface of the extruder barrel is minimized to help reduce shear forces that may be exerted on the cheese mass as it is conveyed by the twin screw assembly. For instance, while being driven in rotation at relatively low speed, e.g., approximately 40 to approximately 60 rpm, the intermeshing twin screw arrangement can still aggregate, mix and compact sufficient viscous cheese mass within the die to support continuous extrusion of the cheese mass, while reducing shear forces exerted on the cheese mass as it is conveyed to the discharge outlet under pressure. The extruder, including the vacuum pump, and integrally attached hopper may be positioned as a unitary unit on an upraised surface, such as a mobile cart, or alternatively positioned on a stationary surface such as a work floor, platform, countertop, etc.

As indicated, the cheese mass that exits the discharge outlet of the extruder is received in and pumped through piping or conduit 205 to a water wheel 204. The water wheel 204 divides the cheese mass flow discharged from the extruder via integral manifold means into a plurality of separate cheese mass substreams of approximately equal flow and pumps them to respective die assemblies 300 for shred production. The water wheel may be a commercially-available configuration, such as one manufactured by Robert Reiser & Co. The water wheel 204 operates using a series of vertical vane pumps in a cylindrical housing. The vane pumps are directly connected by metal shafts which ensure that each vane pump rotates at the same rate and delivers the same amount of material to its associated die and cutter set-up.

Referring to FIG. 3, each die assembly 300 includes a die 301 comprising a die plate 303 having elongated orifices 305 separated by land areas 304, an extrudate cutter 307, and a double gated shred collector/dispenser 309. The elongated orifices 305, i.e., through-holes, provided in die plate 303 are elongated shapes adapted for receiving, shaping and discharging cheese mass as extrudate in strand form (e.g., see FIGS. 4-6). In this embodiment, die plate 303 is mounted flush in a die plate support member 3010. The opposite side of the die plate (not shown) may be fed a cheese substream from the water wheel 204 in piping including a flared fitting (not shown) that adjusts (viz., increases) the diameter of the feed conduit to be as large as the orifice pattern in the die plate 303. The die plate 303 may include a central shaft receiving opening 308 for reasons indicated below relative to the embodiment shown in FIG. 9. As indicated in FIG. 3, each cheese mass substream is discharged through the elongated orifices in the die plate assigned to that product depositing lane as cheese extrudate strands, which are intermittently cut along their length with the integral cutter or slicer 307 associated with the die to form discrete cheese shreds having cross-sectional shapes substantially corresponding to shapes of the orifices provided in the die plate.

Referring still to FIG. 3, in this arrangement the extruder is run continuously at constant pressure while flow rate gate 1 of shred collector/dispenser 309 is kept open and gate 2 kept closed, to accumulate a quantity of shredded cheese product (stage A). As shown, the shred collector/dispenser 309 includes a shred collecting chamber 311 having openable/closable gate 1 at its upper end and another, gate 2, at its lower end. Collector/dispenser 309 includes an upper housing structure 313 which confines and guides falling cut shreds into chamber 311 below. Then, as a food tray arrives under gate 2 of collector/dispenser 309, such as via a production line conveyor or manually, gate 1 is closed and gate 2 of the shred collector/dispenser 309 is opened to deliver the collected shredded product into the tray (stage B). After depositing collected quantity of cheese shred, gate 2 is closed and gate 1 is opened again to restart the deposition cycle as described above. In one particular embodiment, these various operations are put under automated control.

In a particular embodiment, the cheese mass may be allowed to undergo a slight temperature increase during processing of several degrees (e.g., about 3° F. or less), but measures are taken to ensure that the cheese mass is kept at a chilled temperature through discharge from the die plate as extrudate strands. Among other benefits, this helps to improve and assure microbiological stability in the cheese product. In order to maintain the temperature of the cheese mass at a temperature below 50° F. during processing including in the extruder, water wheel, and at least until discharged from the die plate as shreddable strands, the system 100 may be set up in a refrigerated work space or room maintained at chilled temperature sufficient for that purpose. Alternatively or in addition thereto, the extruder, conduit, water wheel, and/or die plate may be equipped with cooling means, e.g., cooling jackets. Also, as previously indicated, a screw conveyor may be used that is driven in rotation at relatively low speed, which reduces shear forces exerted on the cheese mass as it is conveyed to the discharge outlet under pressure. The use of low shear conditions in the extruder has advantages. For example, occurrence of significant fat coalescence (e.g., fat globule formation), oiling (e.g., oil/solid mass phase separation), and/or protein aggregation is minimized, thereby improving product texture, homogeneity, and firmness.

Although FIGS. 1-3 illustrate a four-lane pressure depositor arrangement, it will be appreciated that one or any multiple number of lanes can be incorporated into the method and system. For instance, in optional scheme 101 shown in FIG. 1, only one die cutter set up is supported, so the four lane pressure depositor is not needed. In this optional mode, cheese mass is directly fed from the discharge outlet of the extruder to the die and cutter set up. It also will be appreciated that the shredding system could be operated without the gated collectors at the depositing subsystem by intermittently extruding and cutting extrudate strand in a manner timed to coincide with tray or food product placement beneath the die plate.

Figure 4:
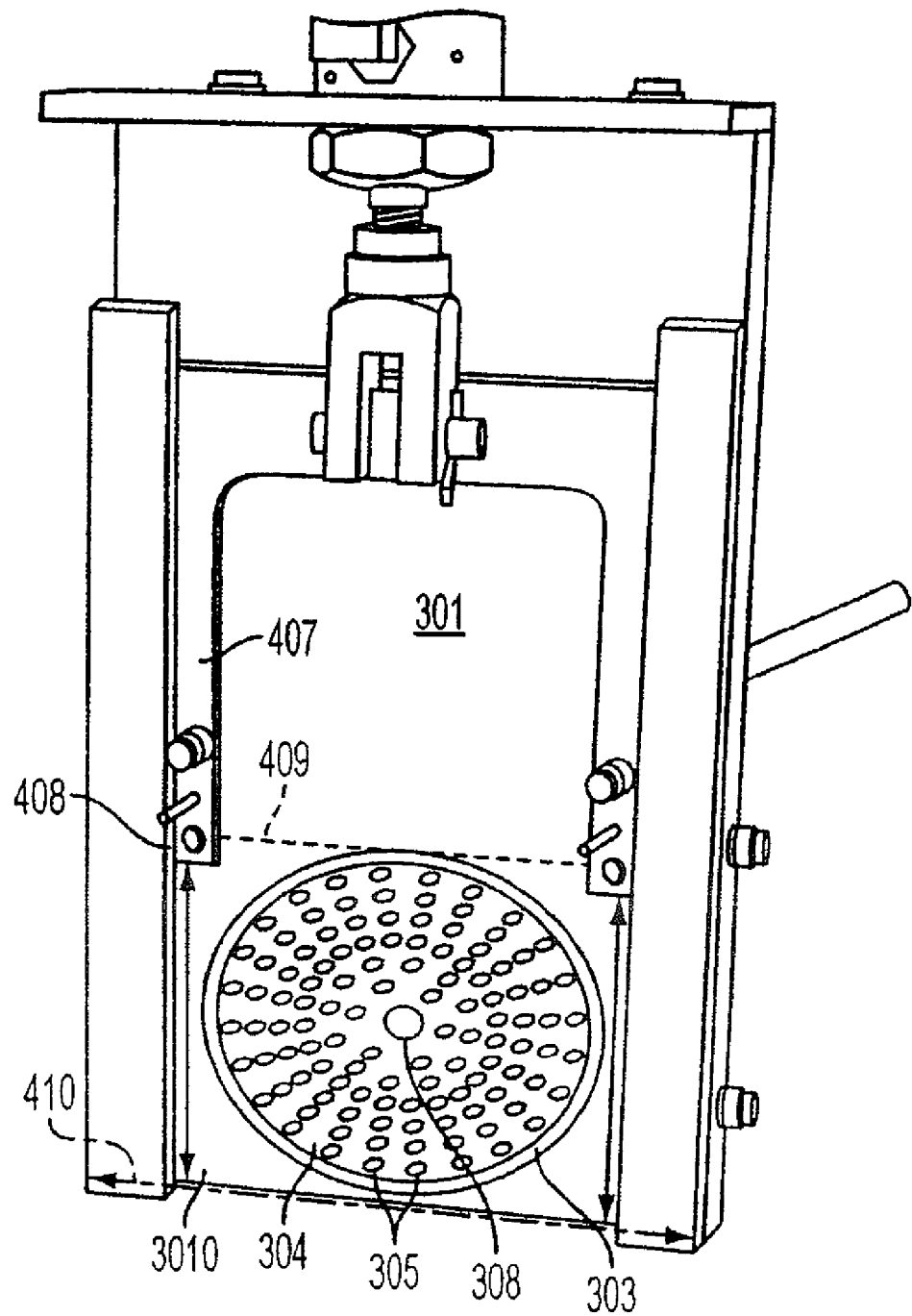
FIG. 4 is a perspective schematic view of a die and cutter assembly, including a die plate having elongated orifices, forming part of the shred depositing portion of FIG. 3.

Referring to FIG. 4, the die plate 303 may be synthetic polymer or metal construction. For instance, die plate 303 may be constructed of stainless steel, aluminum, etc. It alternatively may be formed of molded plastic construction. The plastic may comprise, e.g., ultra high molecular weight polyurethane. The orifices 305 may be formed in the die plate by machining techniques suitable for the metal or plastic construction, as applicable. Alternatively, a metal or plastic die plate may be cast, or a plastic die plate injection molded, as a unitary structure including the orifices.

Figure 5:
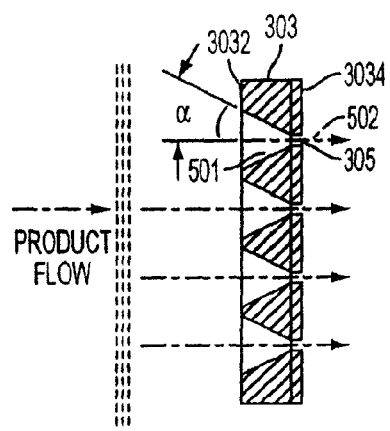
FIG. 5 is a partial cross-sectional view of the die plate of FIG. 4.
Figure 6:
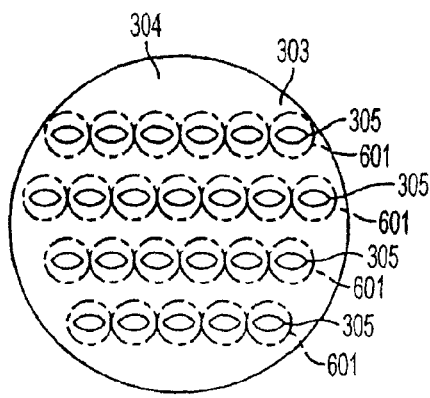
FIG. 6 is a partial front elevational view of the die plate of FIG. 4.

The orifices 305 may comprise passageways having a constant cross-sectional shape through the thickness of the die plate. Alternatively, as illustrated in FIG. 5, the orifices 305 may comprise two portions comprising a first passageway portion 501 at the input (i.e., cheese-mass receiving) side 3032 of the die plate 303 having a frustoconical shape that is angled at about 45° (i.e., angle α) relative to the product flow direction, and which converges to and communicates with a second passageway portion 502 at the extrudate discharge side 3034 of the die plate 303 that includes discharge orifice 305 having a shape that corresponds to the desired cross-sectional shred shape. The tapered first passageway 3032 effectively smoothens the surface of the resulting extrudate strands. FIG. 6 shows the entry openings 601 of the first passageways 501 at the rear side 3032 of the die plate in hatched lines, which are hidden in this frontal view, and the shape of the orifices 305 in solid lines.

For a die plate of approximately 15.2-20.3 cm (approx. 6-8 inch) diameter and an approximately 9.5 mm (⅜ inch) thickness, the plate may have approximately 100-140 orifices with the elongated shapes, such as almond-, oval-, elliptical-, or rectangular-shapes, and the like. The orifices are space-apart from one another and separated by land portions in the die plate. In one embodiment, the orifices have a major diameter/minor diameter ratio of about 2.25:1 to about 1.75:1. The orifices have a major dimension of about 6 mm to about 6.5 mm, and a minor dimension of about 3 mm to about 3.25 mm.

In one embodiment, the die plate may have a thickness, which corresponds with the length of the passageways therein, approximately 6 mm (0.25 inch) to approximately 13 mm (0.5 inch).

Figure 7:
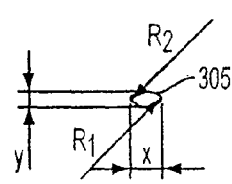
FIG. 7 is an enlarged plan view of a single representative die plate orifice of the die plate of FIG. 4.

Referring to FIG. 7, in one non-limiting embodiment, the dimensions of the orifices provided in the die plate when used for extruding high moisture (e.g., about 52%) cheeses at temperatures less than about 50° F. are about 3.175 mm (0.125 inch) in the minor axis "y" direction, and about 6.35 mm (0.250 inch) in the major axis "x" direction. The radii of curvature $R_1$ and $R_2$ of the upper and lower arc segments, respectively, defining the almond shaped orifice is about 2.3 to about 2.7.

Figure 8:
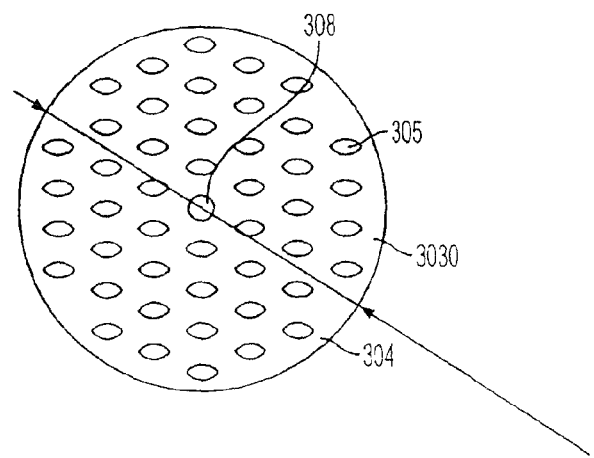
FIG. 8 is an isolated plan view of an alternative die plate configuration which may be used to form part of the die and cutter assembly of FIG. 4.

Referring to FIG. 8, an alternative die plate 3030 configuration is illustrated, wherein the orifices 305 are arranged in vertical columns and diagonally-oriented rows in which orifices are staggered in location to provide substantially even spacing between orifices in a given column or row, and between orifices in adjoining columns and rows.

After being discharged from die plate 303, the extrudate cheese strands typically are intermittently cut into discrete non-continuous shreds with any suitable means for that purpose. The cutting or slicing means may comprise a knife or other cutting device, such as a wire cutter knife, an air knife, a metal guillotine, rotary cutter, knock-off or a flicker wheel, and so forth. The motion of the cutting device and exit speed of the formable food product are two factors that regulate the length of the final shred product. The cutting device may include a mechanism for cutting the continuously extruded strands to desired lengths, depending on the food application. For example, the shred lengths formed may be about 1 to about 15 cm, although other lengths also can be provided. In some embodiments, the cutting device may have a reciprocating or circular motion. For instance, as illustrated in FIG. 4, a harp cutter 407 fitted with single cutting wire 409 is equipped to reciprocate vertically up and down, as indicated by the arrows, between its illustrated pre-cutting position 408 and extended position 410 during a cutting stroke, to cut the cheese extrudate strands to desired discrete lengths.

Figure 9:
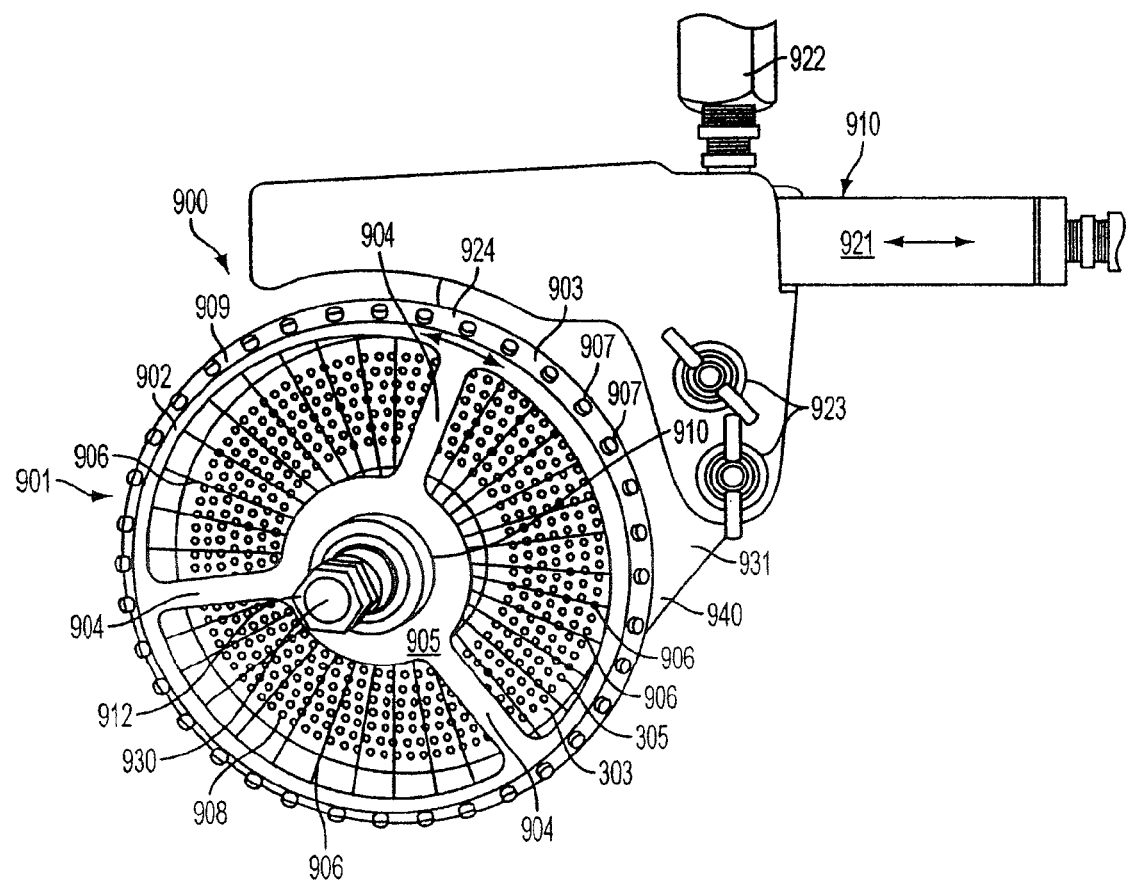
FIG. 9 is an elevational side elevational view of a shred cutter which can be used with the shred depositing portion of the cheese shredding system of FIG. 2.

Referring to FIG. 9, in another embodiment a cutting assembly 900 includes a multiwire cutting member 901 and a pneumatic drive mechanism 920 operable to controllable rotate the cutting member 901 reciprocally back-and-forth in a counter-clockwise/clockwise circular motion relative to the cheese strand being extruded from die plate 303 to intermittently cut the cheese extrudate strands into discrete shreds. The multiwire cutting member 901 includes a cutting wire support frame 902 having a circular rim portion 903 and a flanged portion 909, and support arms 904 extend between the rim portion and a central collar support member 905. In this illustration, three equidistantly spaced support arms 904 are provided to connect the rim portion 903 to the central collar support member 905, although it will be appreciated that different numbers of support arms may be used. A plurality of wires 906 are strung radially between the central collar member 905 and the circular rim portion 903 and are rigidly connected to those components at opposite ends of each wire so that the wires are taut and can slice extrude efficiently. String-lock screws 907 or other suitable connecting means may be used for this purpose at the opposite ends of the wires. In this illustration, twelve wires are strung between the rim portion 903 and collar support member 905 in the open spaces 908 between each neighboring pair of support arms 904. The central collar support member 905 has a central hole 910 adapted to receive a threaded shaft 930 that is mounted rigidly to the die head 931 that supports die plate 303, which also has a central opening 308 (see FIG. 4) through which the threaded shaft 930 can be received. A biasing spring (not shown) is fitted onto the shaft 930 underneath collar 905. A shaft nut 912 is fitted onto threaded shaft 930 at the opposite outer side of collar 905. The position of the nut 912 on threaded shaft 930 is manually adjustable so that a slight gap can be provided between the wires 906 and the outer face lands 304 of the die plate 303.

Pneumatic drive mechanism 920 includes a pneumatic cylinder 921 housed in a sleeve 922 which is bolted (923) to a bracket arm 940 that is integrally connected to the die head 931. The pneumatic cylinder 921 is hingably connected at one end (not shown) to clip member 924 that is fastened to a flanged portion 909 of rim portion 903 of cutting member 901. Pneumatic cylinder 921 is also fitted with a valve stem 922 through which needle valve control is made, such that pressurization causes cylinder 921 to stroke or translate laterally towards cutter part 901, which in turn causes a counter-clockwise rotation of cutting member 901, as indicated by the direction arrows in FIG. 9. The cutting assembly 900 is configured such that the cylinder stroke moves each cutter wire 906 across about 2-4 columns of orifices 305 effective to cut extrudate strands without smearing the extrudate. On relieving air pressure to the cylinder 921, the cylinder 921 retracts in the opposite lateral direction back to its original at-rest position, which causes clockwise rotation of cutting member 901 effective that the wires 906 can again cut extrudate strands while moving in the opposite rotational direction. In a particular embodiment, the movement of the cylinder 921 is timed with the discharge rate of the cheese extrudate so that shreds can be formed of desired discrete lengths. In another alternative cutting configuration, a rotating multi-bladed prop-type slicer may be mounted on the outer face of the die plate and rotated at a speed timed to cut extrudate strands at desired lengths.

Figure 10:
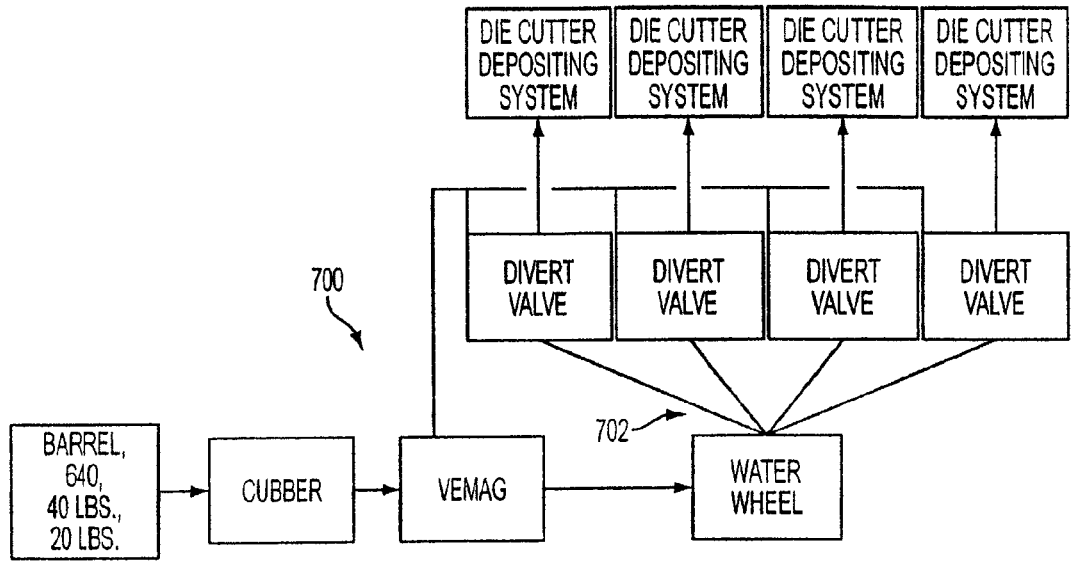
FIG. 10 is a flow chart of a process for converting a cheese pieces into cheese shreds according to alternate embodiments of the present invention.
Figure 12:
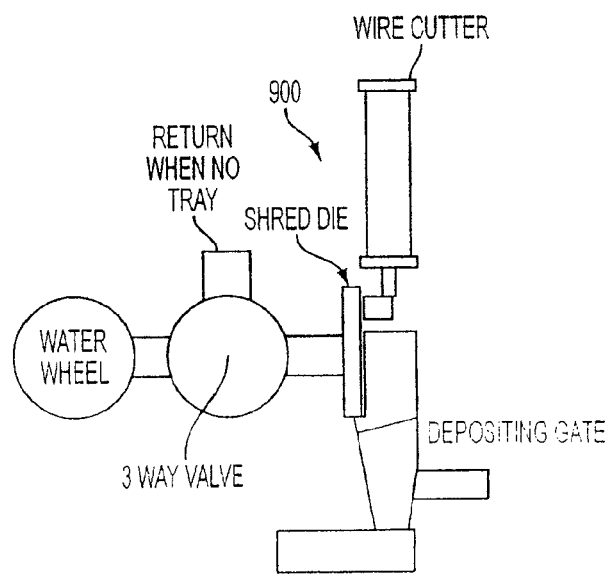
FIG. 12 is an elevational side elevational view of a shred depositing portion of the cheese shredding system of FIG. 11.
Figure 11:
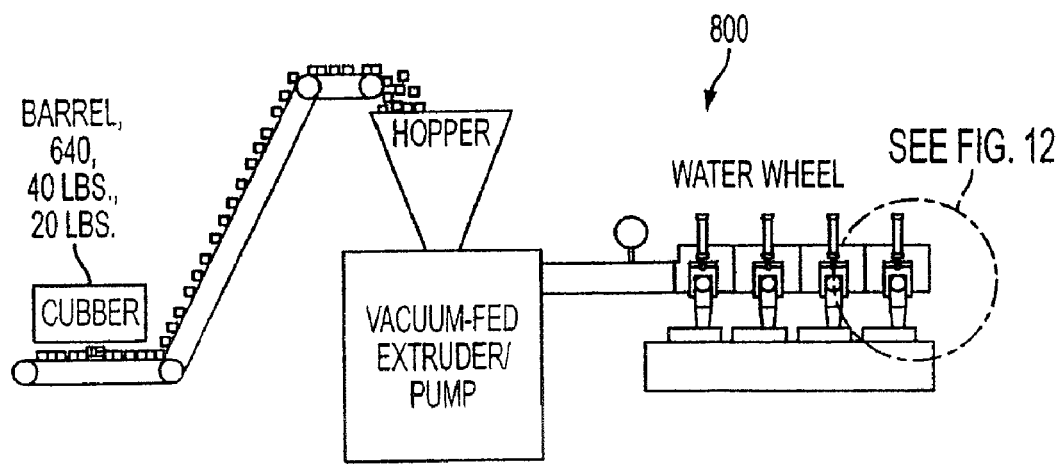
FIG. 11 is an elevational side elevation view of portion of a cheese shredding system including a vacuum-assisted loading extruder in accordance with the embodiment of FIG. 10.

Referring to FIGS. 10-12, alternative shredding systems of embodiments of this invention are illustrated. In mode 702, this arrangement is similar to the system described in FIGS. 1-3 except that a three-way diverter valve is interposed between the water wheel and die and cutter set-up to allow diversion of cheese mass from a cheese mass substream back into the extruder when no tray or food product is ready to receive shredded product.

Referring to FIGS. 13-17, alternative embodiments for a cheese slicer system 30 are illustrated. This system may similarly feed cheese pieces into an extruder hopper where the cheese pieces can also descend into an extruder unit including a low-shear vacuum pump that works the cheese into a cheese mass. The cheese pieces pass through a low-shear pump, preferably a gear pump such as the KS Vacuum Filler, Type P9 SE, manufactured by Karl Schnell GmbH & Co. KG, which feeds the cheese through it to the discharge outlet 22. At the discharge outlet 22 of the pump chamber the cheese mass may be forced through a length of outlet piping followed by a funnel 16 at its discharge end. At the funnel outlet 16b the cheese may be extruded through a die plate 18 with wires attached, or another similar cutting device attached. The material of construction of the funnel may be either metal or plastic, and preferably may be stainless steel metal. Furthermore, a water wheel and flow dividers are not necessary with the slicer system.

Figure 13:
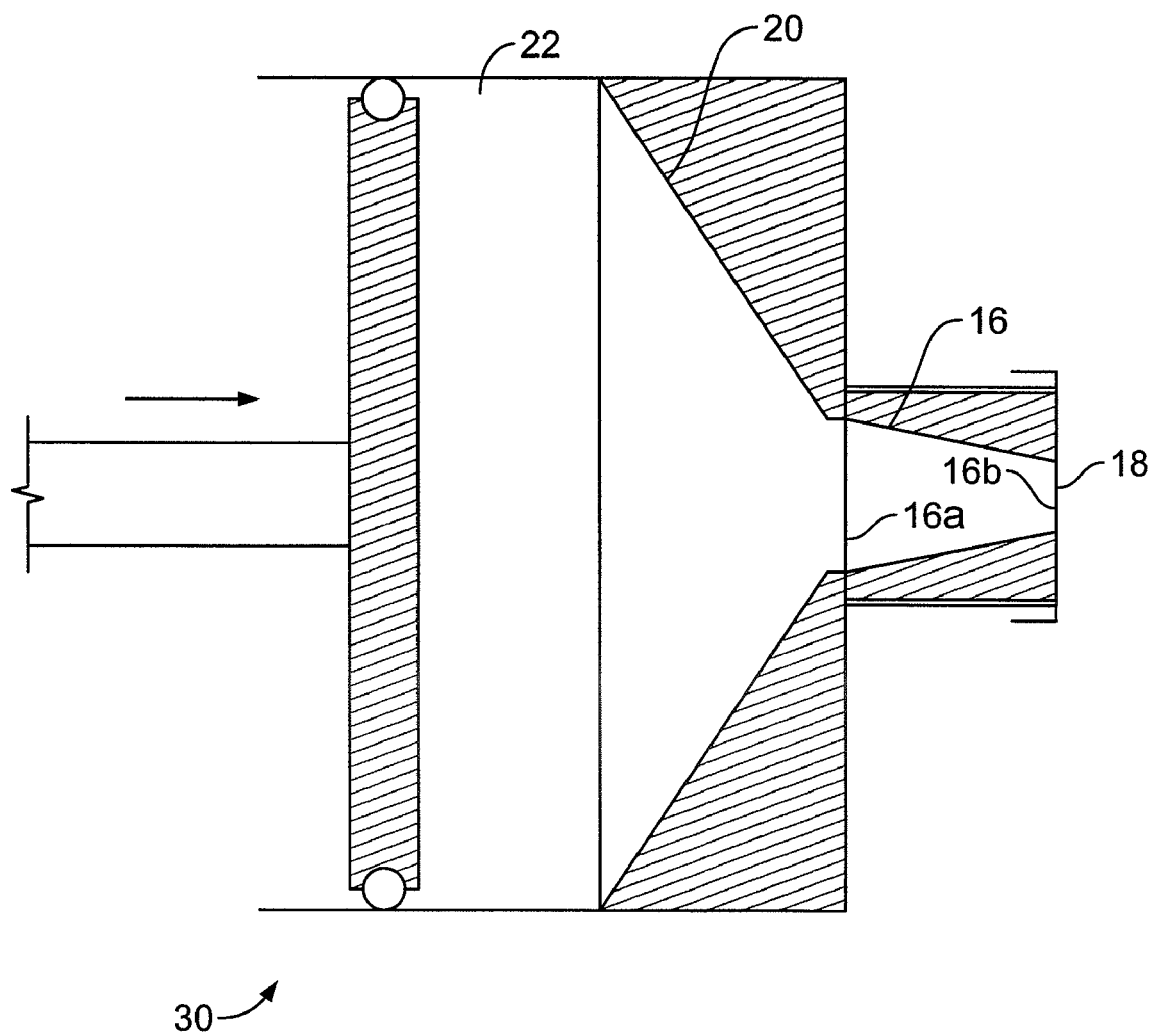
FIG. 13 is a side cross-sectional view at the pump discharge showing the funnel and the die plate attached.

Referring to FIG. 13, a portion of a cheese slicer system 30 is shown at the discharge outlet 22 from the pump chamber. As the cheese mass is forced out of the pump chamber it may pass through a length of pipe (not shown) at the discharge outlet 22 of the pump chamber. Preferably, the pump outlet 22 and the outlet piping may both have diameters of about 3.8 cm to about 9.0 cm (about 1.5 inches to about 3.5 inches), preferably about 6.4 cm in diameter (about 2.5 inches), although the outlet 22 of the pump chamber may also be a different diameter than the outlet piping and may vary from about 3.8 cm to about 13.0 cm (about 1.5 inches to about 5 inches). The length of the outlet piping may vary, and preferably may be as short as possible. Optionally, a size reducer 20, such as a pipe reducer or an additional funnel, may be used at the discharge outlet 22 of the pump chamber and just prior to the inlet of the outlet piping. To minimize the shear effect upon the cheese mass as it exits the pump, the discharge outlet 22 of the pump should be about the same diameter as the outlet piping; when that is not the case, then a reducer 20 may be used to make them the same. The inlet of the reducer 20 can be sized to fit the discharge outlet 22 of the pump chamber, and may have a major diameter between about 3.8 cm to about 13.0 cm. The outlet of the reducer 20 may be sized to fit the diameter of the outlet piping, and may have a minor diameter of about 3.8 cm to about 9.0 cm, and preferably about 6.4 cm.

At the discharge end of the outlet piping (not shown) a funnel 16 may be attached, which can also be downstream of a reducer 20, if one is used, or alternatively may be attached directly to the pump outlet 22. The funnel 16 can be used to shape the cheese mass to a required shape for forming slices upon exiting and to compact the cheese firmer, and may also further reduce the size of the cheese mass stream that exits it. Any shape cheese mass may be made coming out of the funnel 16 with the outlet 16b shaped accordingly, and typically a generally rectangular shape is desired upon exiting the funnel 16. The inlet 16a of the funnel 16 may be sized to fit the diameter of the outlet piping. For example, the diameter of the inlet 16a to the funnel 16 and the pipe diameter may both be from about 3.8 cm to about 9.0 cm (about 1.5 inches to about 3.5 inches), preferably about 6.4 cm in diameter (about 2.5 inches). The outlet 16b of the funnel 16 may be generally rectangular or another non-circular shape, such as a star shape, an oval shape or a square shape, for example. If a generally rectangular shape is used, the outlet 16b of the funnel 16 may be sized at about 1.2 cm to about 3.8 cm (about 0.5 inches to about 1.5 inches) on a minor side and about 1.5 cm to about 6.6 cm (about 0.6 inches to about 2.6 inches) on a major side, and preferably may be about 2.5 cm on a minor side and about 4.0 cm on a major side (about 1.0 inch on a minor side and about 1.6 inches on a major side). The cross-sectional area of the inlet 16a of the funnel 16 may be greater than the cross-sectional area of the outlet 16b.

The funnel 16 and possibly a reducer 20 may be necessary to help minimize the shear on the cheese as the cheese transitions to a smaller diameter pipe from a larger diameter. When the funnel is used alone or with a reducer, it gradually tapers the size from a large diameter to a smaller diameter, thus minimizing the shear upon the cheese. High shear may occur when an outlet is reduced in diameter abruptly and is not desirable because it may make the cheese softer, which can cause the texture and the taste of the cheese to change undesirably.

Figure 14:
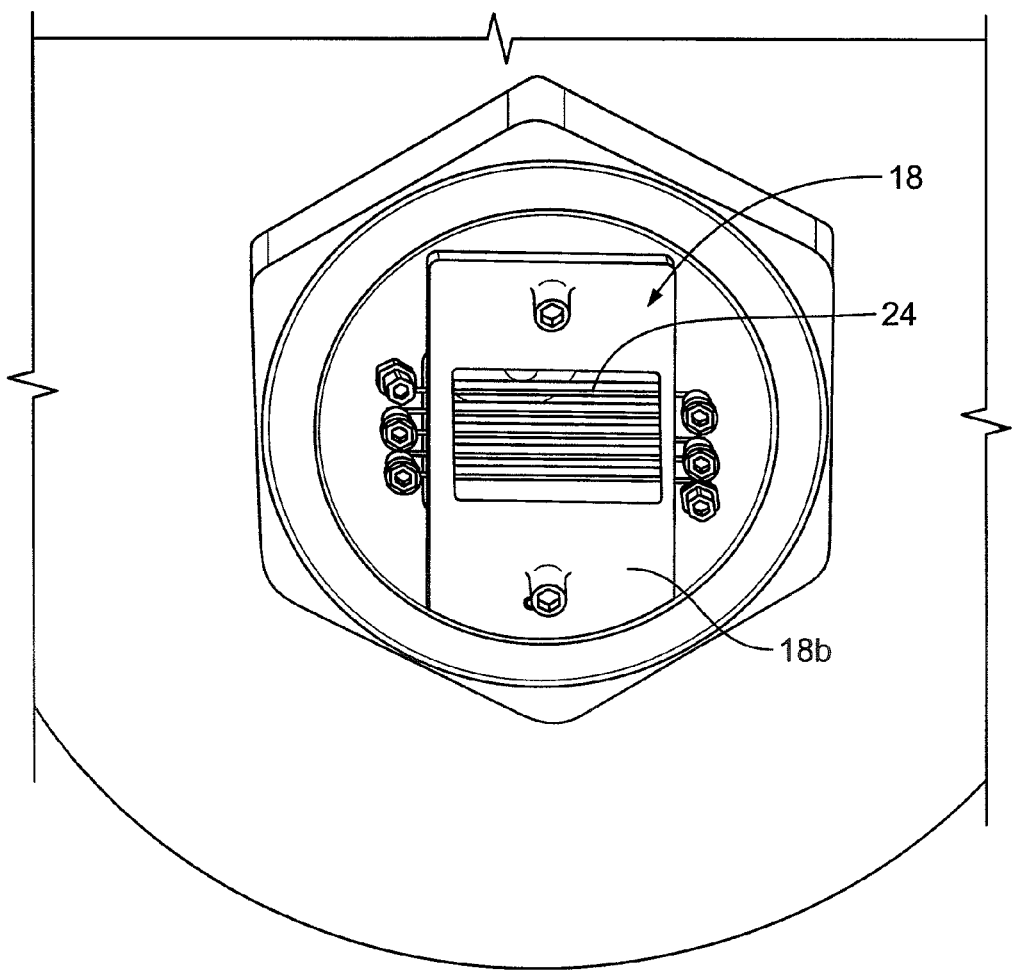
FIG. 14 is a front perspective view of the discharge side of the die plate at a piping or funnel outlet.

At the outlet 16b of the funnel 16 a die plate 18 may be attached aligned with the discharge outlet of the funnel 16 or a pipe that is downstream of the pump. The die plate 18 may comprise one or a plurality of harp wires 24, as illustrated in FIG. 14, or other similar cutting elements, strung across the discharge side 18b of the die plate 18 from one end of the die plate to the other. The wires 24 can be strung parallel to one another in a direction transverse to a machine direction and the wires 24 may be located at or near the outlet 16b of the funnel 16. The die plate 18 may contain a plurality of elongated orifices at the die plate 18 that may be generally rectangular in shape and substantially parallel to each other, transverse to a machine direction. The elongated orifices may be defined by the edges of one or more wires 24, for example, which may straddle the inlet 18a and discharge sides 18b of the die plate 18 and in the case of the outer edge slots, for example, the orifice may be defined by the die plate wall, where the orifices may be spaced apart from one another and separated by the wires 24. Typically 5 or 7 wires may be used, which yield about 6 or about 8 slices, respectively. The wires 24 may be of a thickness between about 0.8 mm to about 1.3 mm (about 16 to 20 gauge), more preferably at about 1.0 mm, which corresponds to approximately an 18 gauge wire. In general, the smaller the wire size the better the cut. However, if the wire is too small (i.e., very fine) it may break. The inlet side 18a of the die plate 18 may be sized to fit the outlet 16b of the funnel 16 and is preferably also a generally rectangular shape. The die plate 18 may have a minor dimension from about 1.2 cm to about 3.8 cm (about 0.5 inches to about 1.5 inches) and a major dimension from about 1.5 cm to about 6.6 cm (about 0.6 inches to about 2.6 inches), which is sized similarly as the outlet 16b of the funnel 16, and preferably may be about 2.5 cm by about 4.0 cm (about 1.0 inch by about 1.6 inches). The material of construction of the die plate 18 may be either metal or plastic, and preferably may be stainless steel metal.

FIGS. 15A-D depict an alternative type of die plate assembly from FIG. 14. In FIG. 15A, the alternative die plate 118 is similar to the die plate 18 in FIG. 14 except that it does not contain harp wires strung across the die plate 118. Rather, the alternative die plate 118 has an opening 118A such that the cheese exiting the funnel may pass through the opening 118A, before passing through the harp plate 218. Additionally, the alternative die plate 118 may also have small grooves 224, as seen in FIG. 15B, along two opposing sides for receiving harp wires attached to a harp plate that may extend over the die plate when the harp plate 218 is placed adjacent to it. The die plate 118 may comprise one or a plurality of grooves 224 on each of the two sides, and preferably the number of grooves per side is equal to the number of harp wires 24 strung across the harp plate 218. The grooves 224 on the die plate 118 may receive the harp wires 24 therein when the harp plate 218 is placed adjacent to it, and allows for a tighter and more flush fit between the die plate 118 and harp plate 218, to be discussed in more detail below. The inlet of the die plate 118 may also be sized to fit the outlet of the funnel 16 and preferably may be generally rectangular shaped as in the die plate 18 in FIG. 14.

The harp plate 218 may be attached adjacent to the discharge side of the die plate 118, which is shown detailed in FIG. 15C. The harp plate 218 may be the same size as the die plate 118 or it may be larger and the harp plate has an opening 218A that may be the same size as the die plate opening 118A or larger. Preferably the opening 218A of the harp plate 218 will be the same dimension as the opening 118A in the die plate 118. The harp wires 24 may be strung across and attached at the discharge side of the harp plate 218 across the opening 218A and parallel to one another in a direction transverse to a machine direction, similar to the positioning of the harp wires 24 on die plate 18, as discussed previously. The harp wires 24 on the harp plate 218 function similarly to the harp wires 24 on the die plate 18 in FIG. 14, and help define the elongated orifices which receive the cheese mass exiting the funnel and the die plate and provide the cheese extrudate sheets.

Optionally, a wiper plate 318, as shown in greater detail in FIG. 15D, may also be used and placed adjacent to the discharge side of the harp plate 218. The wiper plate 318 has an opening 318A which functions to allow the cut cheese extrudate sheets to pass through it and to smooth out and shape the newly cut cheese slices by wiping off or removing any residual pieces or loose cheese from the newly cut cheese slices as they pass through the opening 318A and brush against the outer edges of the opening 318A.

An alternative to the gear pump may be a piston-type pump, such as the OPTI-220, manufactured by Marlen Research Corporation. A piston pump, however, cannot continuously feed the cheese mass, as the gear pump can. The piston pump can push the cheese through using a piston and as its chamber fills up with the cheese it applies a force against the cheese to advance it in a forward machine direction. Some piston pump models may also include a reducer, such as an additional funnel, already built into the pump itself and located at the pump outlet. This additional funnel may already reduce the size of the outlet down to the diameter of the outlet piping. At the discharge end of the outlet piping the funnel with the attached die plate may be positioned. The parameters for the funnel and die plate in this example can be similar to those discussed above.

Figure 17:
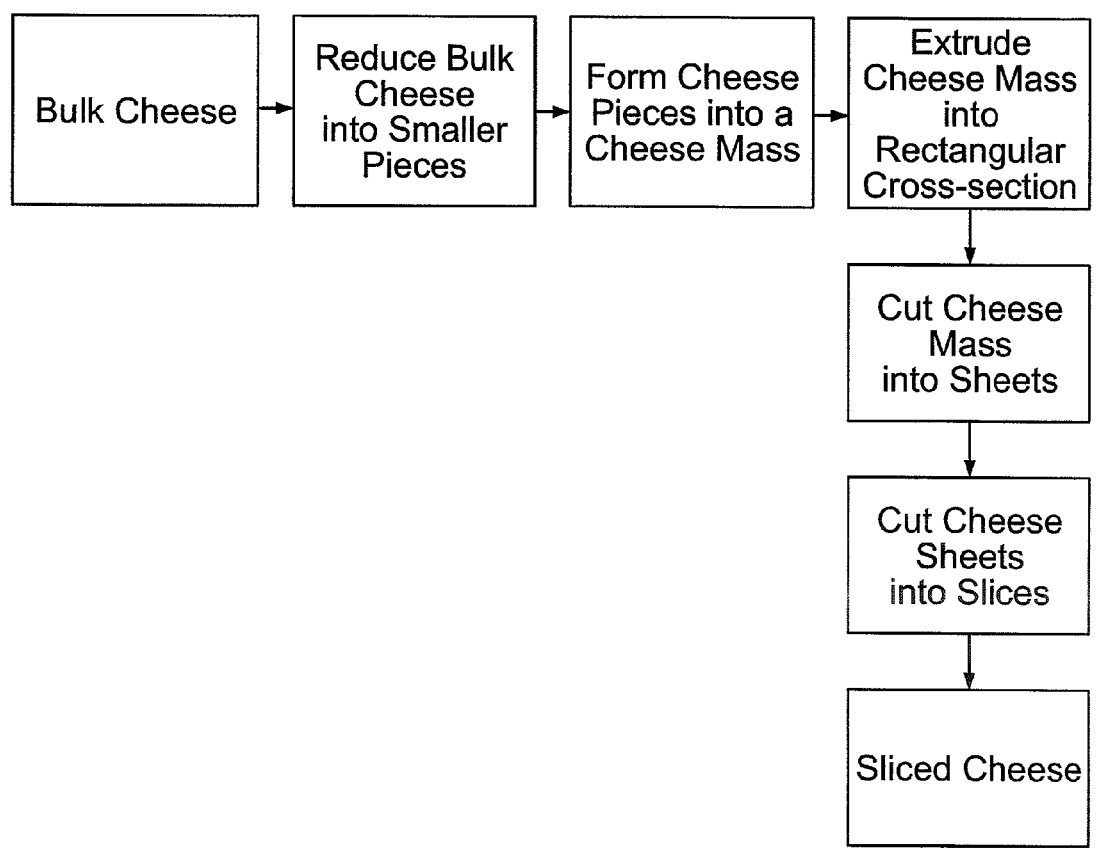
FIG. 17 is a flow chart of a method for converting cheese pieces into cheese slices according to an embodiment of the present invention.

An example of the overall slicing process is illustrated in FIG. 17, which is a flow chart of a method 101 for converting cheese pieces into cheese slices. In this process, a large cheese barrel or block is subdivided into smaller blocks and then cubes, which are fed into an extruder operable to work the cheese pieces into a homogenous mass in ambient or chilled (unheated) conditions and then convey the cheese mass to the discharge outlet by the force from the extruder/pump. The cheese mass may advance in a forward machine direction (i.e., longitudinally) through the discharge outlet and into an outlet piping. If the diameter of the pump chamber outlet is approximately 7.6 cm then no reducer is needed and the diameter of the outlet piping may also be approximately 7.6 cm. After the cheese mass passes through the outlet piping it can enter into the inlet 16a of the funnel 16, which may further reduce the cheese mass to a smaller sized diameter as well as shape the cheese mass to an alternate shape upon exiting the funnel 16. As the cheese mass exits the funnel 16 it can be extruded through a plurality of elongated orifices at a discharge side 18b of the die plate 18, which may be attached at or near the outlet 16b. The die plate 18 may contain a number of wires 24, which cut the cheese mass as it passes between the plurality of elongated orifices and cuts the cheese mass into extrudate sheets stacked on top of one another, and preferably into six to eight sheets. As the cheese extrudate sheets exit the die plate 18, the sheets may be cut by an optional slicer at the discharge side 18b of the die plate 18 or by a separate cutting mechanism further downstream from the die plate 18. The cheese sheets may have the following dimensions of a height between about 1.2 cm to about 3.8 cm (about 0.5 inches to about 1.5 inches) and a width between about 1.8 cm to about 4.3 cm (about 0.7 inches to about 1.7 inches), and preferably a height of about 2.5 cm and a width of about 3 cm (about 1.0 inch high and about 1.2 inches wide).

When a separate cutting mechanism is used, the sheets may be extruded directly onto a conveyor which transports the sheets to a cutting device or slicer after exiting the die plate. The conveyor may be equipped with a knife, such as an ultrasonic knife, which cuts the sheets into slices of desired length. These final slices may be sized such that a stack of six slices, for example, would be about 2.5 cm tall, about 4.0 cm long and about 3.0 cm wide (about 1.0 inch by 1.6 inches by 1.2 inches), where the length is parallel to a machine direction and the height and width are transverse to the machine direction. The motion of the cutting device and exit speed of the sheets are two factors that regulate the length of the final sliced product. For example, the cheese extrudate sheets may exit the funnel and die assembly as long strips or ribbons of cheese and pass in a machine direction through the cutting assembly having a knife which cuts the cheese extrudate sheets transverse to the machine direction, and where the knife blade may travel longitudinally, for example. The cheese slices may all be of substantially equal length since the rate of cutting the sheets should remain relatively constant. After the cheese sheets are cut into slices, the slices may continue to travel in a machine direction further down a conveyor where the slices can be picked off the line and packaged in a food container or tray.

It will be appreciated that this invention is especially useful for directly converting chilled high-moisture cheeses, such as refrigerated mozzarella cheese having a moisture content of at least about 52%, into shredded form without needing to provide heated conditions in the inventive shredding system. In a particular embodiment, the cheese pieces are introduced into, processed within the extruder, and extruded in strand-form at the die plate, at a temperature less than about 45° F., more particularly, less than about 40° F. In one aspect, refrigerated cheese is fed into the extruder chamber, and the cheese mass formed therefrom in the extruder is conveyed to the die plate, while being maintained under refrigerated temperature conditions. In one aspect, the temperature of the cheese when extruded at the die plate is about 32° F. to about 45° F., particularly about 35° F. to about 45° F. In this manner, it is possible to directly convert refrigerated or otherwise chilled cheese pieces into shreds of approximately uniform dimensions without the need to heat the cheese to flowable or molten state to assist extrusion, which further avoids the need to provide post-extrusion quench procedures to stabilize and avoid shape distortion from occurring in otherwise hot extruded shapes. This inventive method and system avoids the need for process control over complex systems incorporating heating jackets or internal heating systems in the extruder, piping, pumps, dies, etc. This reduces process complexity, requirements and costs.

It will further be appreciated that this invention is especially useful for converting an extruded cheese mass into a sliced form without needing to provide heated conditions in a similar fashion as with the shredding system.

Also, although use of ingredients in addition to the cheese pieces are not categorically excluded from the method, no processing aids or product modifiers, e.g., water, salt, plasticizers, emulsifiers, etc., need be included with the cheese pieces fed into the process system described herein to provide high quality cheese shred product. For instance, raw natural or process cheese material by itself can be processed in the shredding system without the need for co-ingredients. Additional edible ingredients, such as meat pieces, vegetable pieces, herbs, spices, vitamins, calcium or other minerals may be optionally added to the cheese mass via the hopper to the extent they are dispersible in the cheese mass and do not obstruct or blind the orifices on the die plate.

The Examples that follow are intended to illustrate, and not limit, the invention. All percentages described herein are by weight, unless indicated otherwise.

Example 1

Leprino brand mozzarella cheese (53% moisture) with starch was cut into 15.2 cm (6 inch)×7.6 cm (3 inch) pieces weighing approximately 0.5 lbs. The cheese temperature at the time of use was about 35° F. and was still about 35° F. after extrusion.

A customized die plate was fitted to an extrusion system, as described below. The die plate was molded rigid plastic construction having an 18 cm (7 inch) diameter and 0.95 cm (⅜ inch) in thickness. The plate had 117 orifices formed in it having almond-shapes, similar to that illustrated in FIG. 6, which were arranged in the die plate in the pattern illustrated in FIG. 4. The orifices extended through the entire thickness of the plate between its opposite exposed faces. The dimensions of the shred orifices were approximately 6.35 mm (0.250 inch) as the major diameter dimension extending laterally across the orifice by approximately 3.175 mm (0.125 inch) as the minor diameter dimension extending vertically across the orifice. The orifices were separated by lands in the die plate. The orifices had cross-sectional shapes corresponding to the desired cross-sectional shape of the cheese strands. The cheese temperature at the time of use was about 35° F. and was still about 35° F. after extrusion.

A VEMAG ROBOT model HP-15C vacuum pump/extruder, manufactured by Robert Reiser & Co. was set-up to operate with the following settings: Weight=0068 000, Pause=0050, Twist=1500, Speed=0, Pl=0. The pressure in the system was between about 300 and about 350 psi. Approximately 80 pounds of the cheese pieces were dumped into the extruder hopper. The screws were operated at about 75 rpm to mix, knead, and compact the cheese pieces into a homogenous cheese mass before exiting the discharge outlet of the extruder. The throughput rate was about 8 lb/min. The cheese mass exiting the vacuum pump/extruder unit was conducted to a Reiser 6-inch water wheel, which divided the cheese mass into separate equal streams collected in respective vane pumps. The water wheel supported die plates mounted on two separate deposition lanes. The divided cheese streams were each pumped from the water wheel to a die plate, described above, and extruded as continuous strands, i.e., the cheese extrudate. The extrudate product was extruded at 35° F. using the die. A wire cutter was used to cut the continuous strands into discrete cheese shreds having lengths of about 3 cm to about 4 cm. The cheese shreds had cross-sectional shapes along their lengths that substantially corresponded to the die plate orifice shapes.

Example 2

Figure 16A:
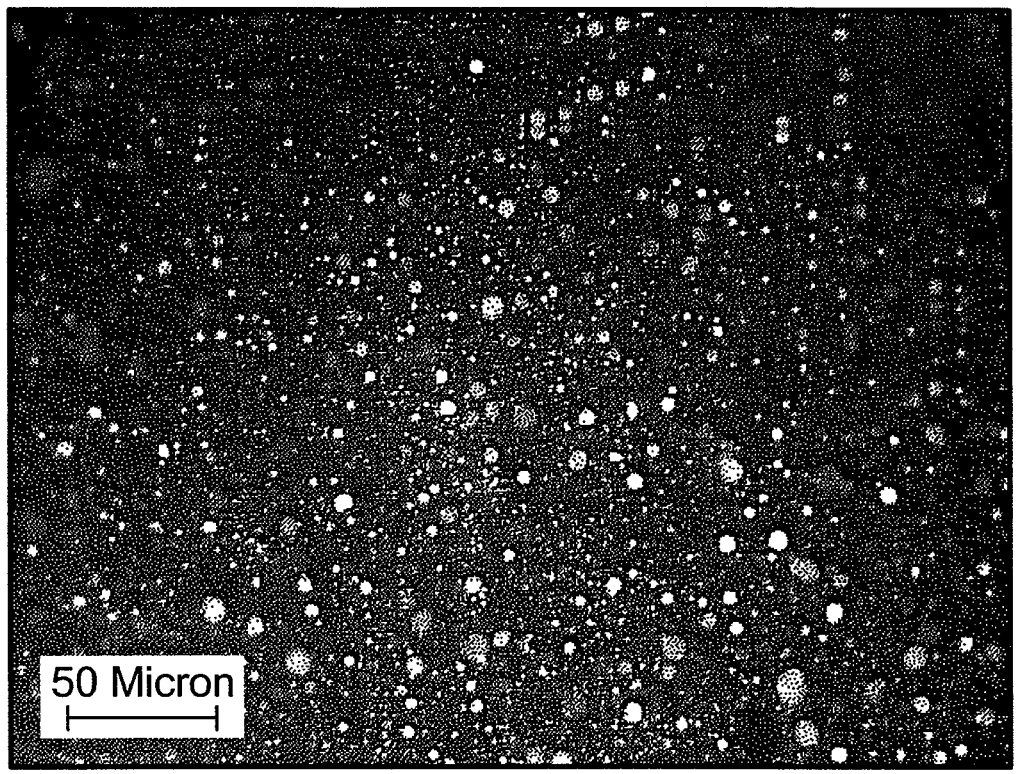
FIGS. 16A-D are microscopic representations of processed cheese and extruded cheese, at either 50 microns or 20 microns magnification.
Figure 16B:
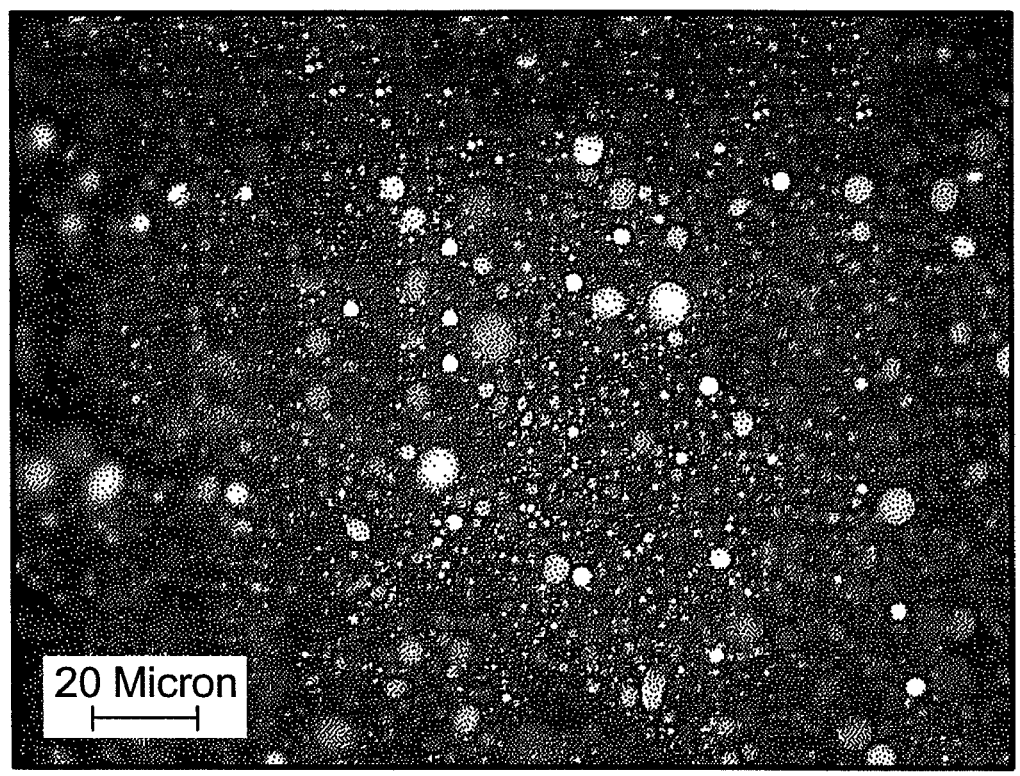

A funnel 16 at the discharge of an outlet piping was used together with a reducer 20 at a pump outlet 22 to gradually transition between pipe sizes when making extruded cheese and was found to help maintain the cheese structure so that it closely resembled a processed, non-extruded cheese structure. This is illustrated in FIGS. 16A-D, which show microscopy results comparing the internal structures of processed cheese that had not been extruded versus extruded cheese using the funnel-reducer system. FIGS. 16A and B depict the control cheese, or processed, non-extruded cheese. FIG. 16A was magnified at a scale of 50 microns, and FIG. 16B was magnified at a scale of 20 microns. The cheese samples were tested using a nile blue staining technique which stained the fat particles in the cheese so that they were more visible when performing the microscopy testing. The fat particles in the non-extruded cheese appeared as droplets or round spheres with two sizes of fat populations of either about 2 um or about 5-10 um in diameter, which is typically common in processed, non-extruded cheese.

Figure 16C:
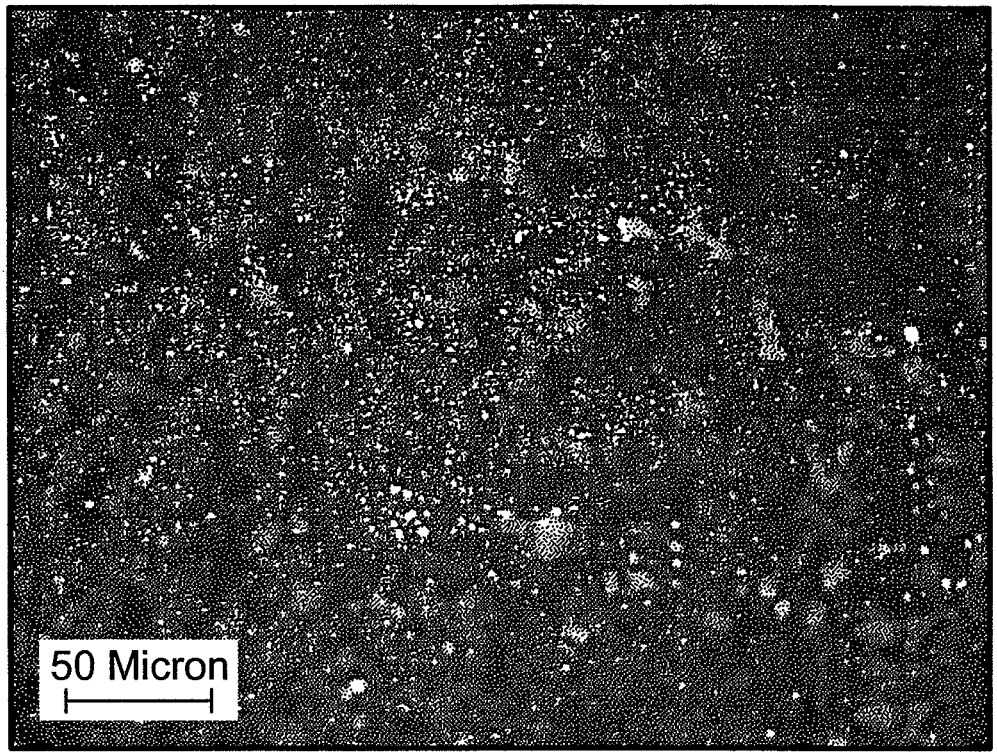
Figure 16D:
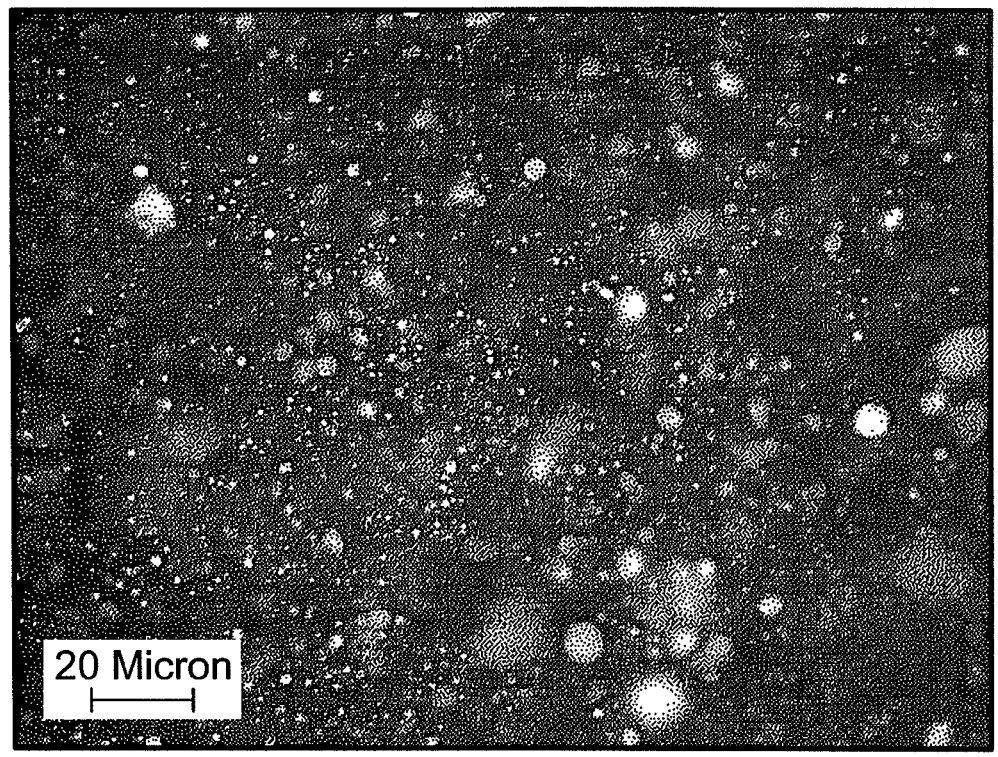

FIGS. 16C-D depict the same degree of magnification for cheese for the extruded cheese samples. The cheese mass passed through a VEMAG ROBOT model HP-15C vacuum pump/extruder, manufactured by Robert Reiser & Co. and having a pump outlet of about 10.2 cm. A pipe reducer was placed at the pump outlet to reduce the diameter from about 10.2 cm to about 7.6 cm. An outlet pipe with a diameter of about 7.6 cm was located at the pump outlet and after the reducer. A funnel was located at the end of the outlet piping and had an inlet of about 7.6 cm and a generally rectangular outlet of about 3.0 cm by about 4.0 cm. In both FIGS. 16C and D, the regular shaped fat droplets were visible, as in the control samples, however a very small number of coalescent fat droplets were also present, which were depicted as slightly irregular shaped spheres. Although, the protein matrix of the extruded cheese was slightly looser than the control and there was a minor degree of coalescent fat present, overall there was no significant difference between the two samples.

While the invention has been particularly described with specific reference to particular process and product embodiments, it will be appreciated that various alterations, modifications and adaptations may be based on the present disclosure, and are intended to be within the spirit and scope of the present invention as defined by the following claims.

What is claimed is:

1. A method for forming cheese slices from a quantity of cheese, comprising:
   introducing at least one discrete cheese piece into an elongated chamber housing a conveyor operable to form a homogenous cheese mass from the at least one cheese piece, the conveyor having twin intermeshing screws configured to minimize shear forces on the homogenous cheese mass and provide a substantially continuous feed, the twin intermeshing screws having minimal clearance relative to an inner surface of the elongated chamber;
   forcing the cheese mass forwardly and longitudinally of said chamber to a discharge outlet of the chamber and into a funnel downstream of the discharge outlet of the chamber;
   extruding the cheese mass at a temperature less than about 50° F. through a plurality of elongated orifices at a discharge side of a die plate which receives the cheese mass after exiting the funnel, providing cheese extrudate sheets;
   and cutting the cheese extrudate sheets into cheese slices.

2. The method of claim 1, wherein the cheese mass is extruded at a temperature less than about 45° F.

3. The method of claim 1, wherein said cheese comprises at least one of:
   sharp Cheddar, medium Cheddar, mild Cheddar, Swiss, American, Gouda, mozzarella, and Edam.

4. The method of claim 1, wherein the elongated orifices comprise one or a plurality of parallel extending cutting elements transverse to a machine direction and at a discharge side of the die plate.

5. The method of claim 4, wherein the cutting elements are one or more wires.

6. The method of claim 5, wherein the wires are attached to a harp plate that is attached to the die plate.

7. The method of claim 5, wherein the cheese mass is cut into extrudate sheets as it passes between the plurality of elongated orifices and over the wires at the discharge side of the die plate.

8. The method of claim 5, wherein the wires have a thickness of about 0.8 mm to about 1.3 mm.

9. The method of claim 1, wherein the die plate has a generally rectangular shape with dimensions defined by about 1.2 cm to about 3.8 cm along a minor side, and about 1.5 cm to about 6.6 cm along a major side.

10. A method for forming cheese slices from a quantity of cheese, comprising:
introducing at least one discrete cheese piece into an elongated chamber housing a conveyor operable to form a homogenous cheese mass from the at least one cheese piece;
forcing the cheese mass forwardly and longitudinally of said chamber to a discharge outlet of the chamber and into a funnel downstream of the discharge outlet of the chamber;
extruding the cheese mass at a temperature less than about 50° F. through a plurality of orifices at a discharge side of a die plate which receives the cheese mass after exiting the funnel, providing cheese extrudate sheets;
cutting the cheese extrudate sheets into cheese slices; and
using a low-shear vacuum pump operable to move-the at least one cheese piece towards the discharge outlet of the chamber.

11. The method of claim 1, wherein an inlet of the funnel has a diameter of about 3.8 cm to about 9.0 cm and is sized to the dimensions of an outlet piping, and an outlet of the funnel has a minor dimension of about 1.2 cm to about 3.8 cm and a major dimension of about 1.5 cm to about 6.6 cm.

12. The method of claim 1, wherein the die plate is attached to an outlet of the funnel such that an inlet side of the die plate is sized to substantially fit the outlet of the funnel, and an inlet of the funnel is sized substantially equal to a diameter of an outlet pipe.

13. The method of claim 1, wherein a reducer is attached to the discharge outlet of the chamber such that an inlet of the reducer is sized to substantially fit a diameter of the discharge outlet of the chamber and the outlet of the reducer is sized to substantially fit a diameter of an outlet pipe.

14. The method of claim 13, wherein the inlet of the reducer has a major diameter of about 5.0 cm to about 10.3 cm and the outlet of the reducer has a minor diameter of about 3.8 cm to about 9.0 cm.

15. The method of claim 1, wherein the cutting comprises employing a cutting device after exiting the die plate to cut the extrudate sheets into slices of desired length.

16. The method of claim 1, further comprising operating the conveyor having twin intermeshing screws configured to minimize shear forces at less than about 75 rpm.

* * * * *